United States Patent
Yoshimochi et al.

(10) Patent No.: US 12,423,833 B2
(45) Date of Patent: Sep. 23, 2025

(54) TRANSMITTER, RECEIVER, AND COMMUNICATION SYSTEM

(71) Applicant: Sony Semiconductor Solutions Corporation, Kanagawa (JP)

(72) Inventors: Naoki Yoshimochi, Tokyo (JP); Yasushi Sato, Kanagawa (JP); Hirosuke Nagano, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 875 days.

(21) Appl. No.: 17/625,944

(22) PCT Filed: Jul. 20, 2020

(86) PCT No.: PCT/JP2020/028115
§ 371 (c)(1),
(2) Date: Jan. 10, 2022

(87) PCT Pub. No.: WO2021/020214
PCT Pub. Date: Feb. 4, 2021

(65) Prior Publication Data
US 2022/0245828 A1    Aug. 4, 2022

(30) Foreign Application Priority Data
Jul. 31, 2019   (JP) .................... 2019-141248

(51) Int. Cl.
*G06T 7/246*   (2017.01)
*G06T 7/215*   (2017.01)
(Continued)

(52) U.S. Cl.
CPC .............. *G06T 7/215* (2017.01); *G06T 7/246* (2017.01); *G06V 10/25* (2022.01); *H04N 23/80* (2023.01)

(58) Field of Classification Search
CPC .......... G06T 7/215; G06T 7/246; G06T 7/20; G06V 10/25; H04N 21/45452;
(Continued)

(56) References Cited

U.S. PATENT DOCUMENTS

| | | |
|---|---|---|
| 2010/0002071 A1 | 1/2010 | Ahiska |
| 2014/0063250 A1 | 3/2014 | Park |

(Continued)

FOREIGN PATENT DOCUMENTS

| | | |
|---|---|---|
| CN | 108307113 A | 7/2018 |
| JP | 2003023629 A | 1/2003 |

(Continued)

OTHER PUBLICATIONS

International Search Report (PCT/ISA/210), International Application No. PCT/JP2020/028115, dated Oct. 12, 2020.

*Primary Examiner* — Sheela C Chawan
(74) *Attorney, Agent, or Firm* — Michael Best & Friedrich LLP

(57) ABSTRACT

A transmitter according to an embodiment of the present disclosure includes a detection section, a generation section, and a transmission unit. The detection section detects ROI image data on a basis of ROI instruction information. The generation section generates ROI information from the ROI image data detected by the detection section. The transmission unit transmits the ROI image data and the ROI information to an external device. The detection section detects motion information on the detected ROI image data on a basis of one of a plurality of pieces of image data obtained at different imaging timings and a plurality of pieces of the ROI image data obtained at different imaging timings.

23 Claims, 17 Drawing Sheets

(51) Int. Cl.
  *G06V 10/25* (2022.01)
  *H04N 23/80* (2023.01)
(58) Field of Classification Search
  CPC .... H04N 21/8146; H04N 23/60; H04N 23/61;
         H04N 23/80; H04N 5/144; H04N
         21/2343
  USPC .................................................. 382/100, 103
  See application file for complete search history.

(56) References Cited

U.S. PATENT DOCUMENTS

| | | |
|---|---|---|
| 2014/0300765 A1 | 10/2014 | Takao |
| 2019/0149751 A1 | 5/2019 | Wise |
| 2019/0236393 A1* | 8/2019 | Wang .................... G06V 10/25 |

FOREIGN PATENT DOCUMENTS

| | | |
|---|---|---|
| JP | 2012209831 A | 10/2012 |
| JP | 2013164834 A | 8/2013 |
| JP | 2014039219 A | 2/2014 |
| JP | 2014204342 A | 10/2014 |
| JP | 2016201756 A | 12/2016 |
| JP | 2019091967 A | 6/2019 |
| TW | 201924325 A | 6/2019 |

* cited by examiner

[ FIG. 1 ]
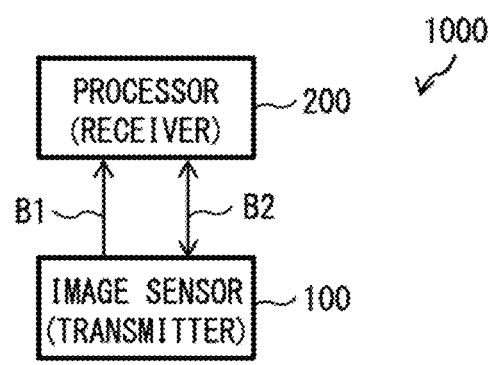
[ FIG. 2 ]
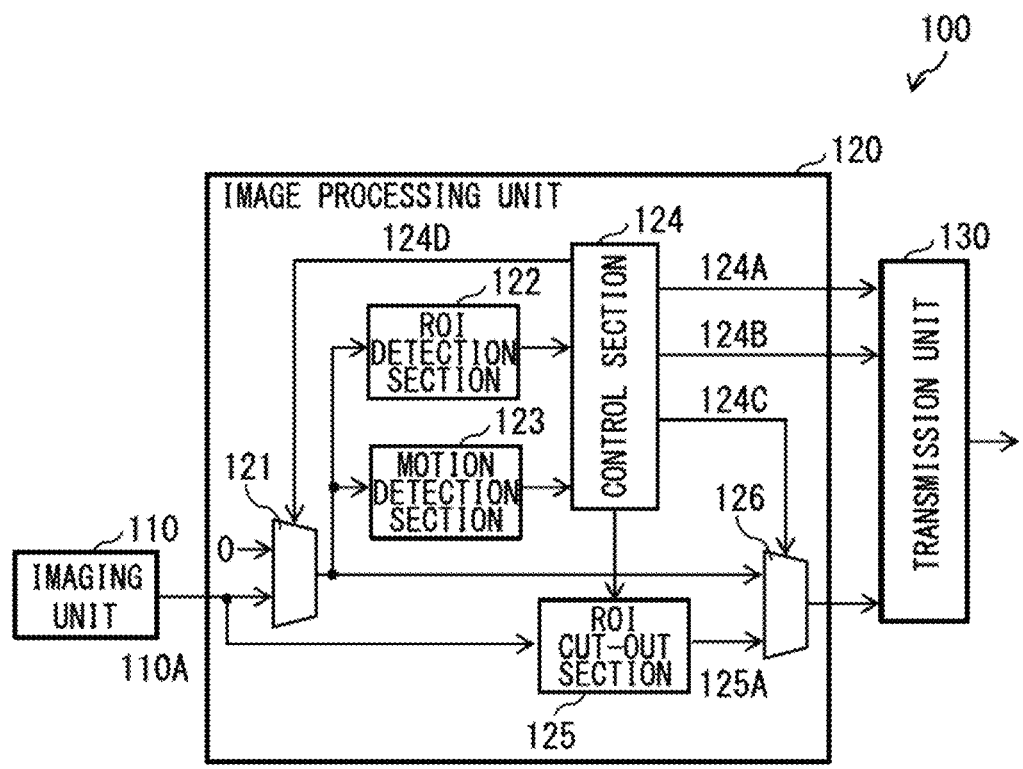

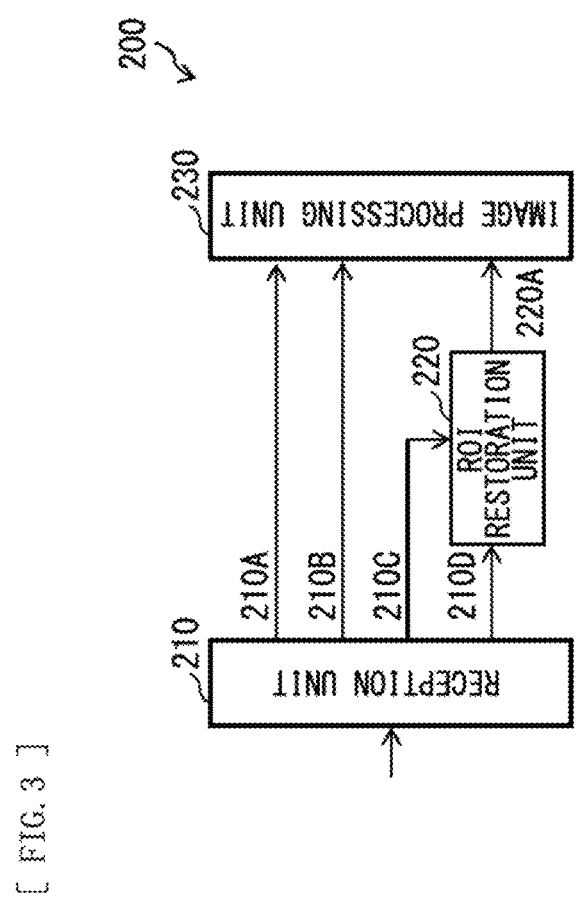
[FIG. 3]

[FIG. 4]
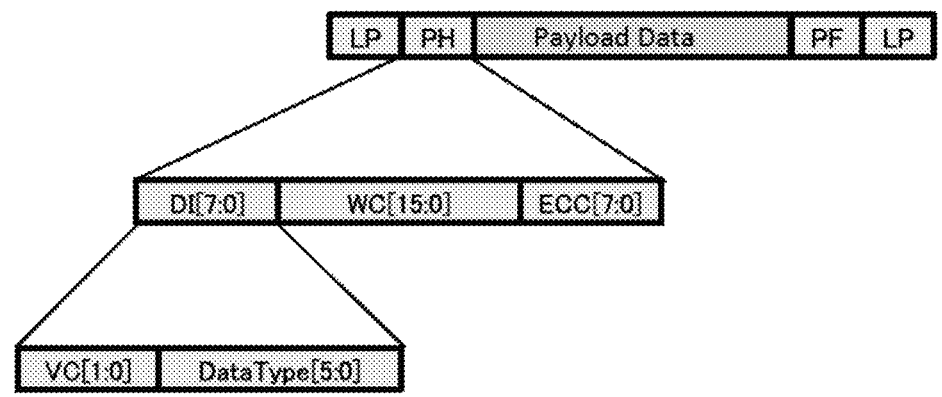
[FIG. 5]
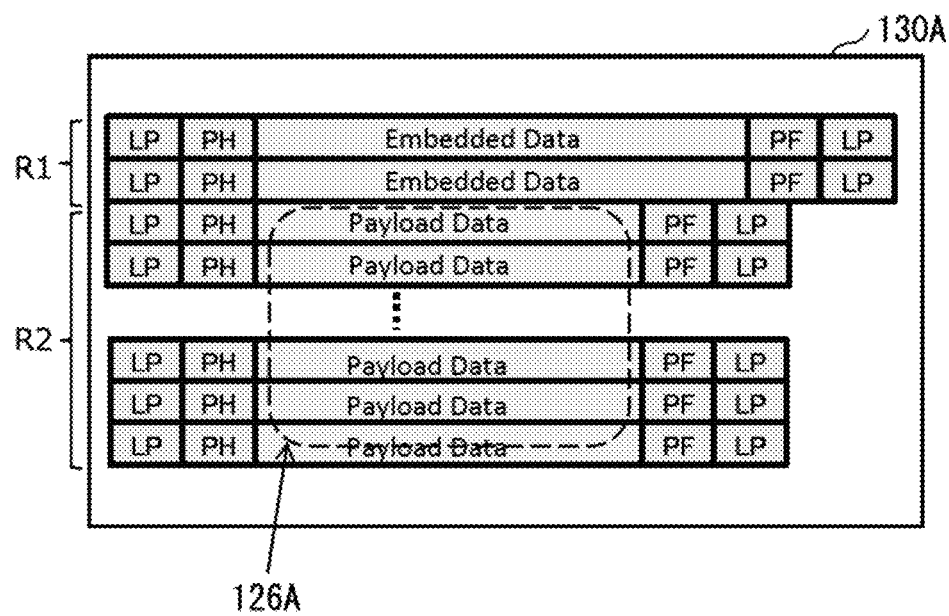

[FIG. 6]
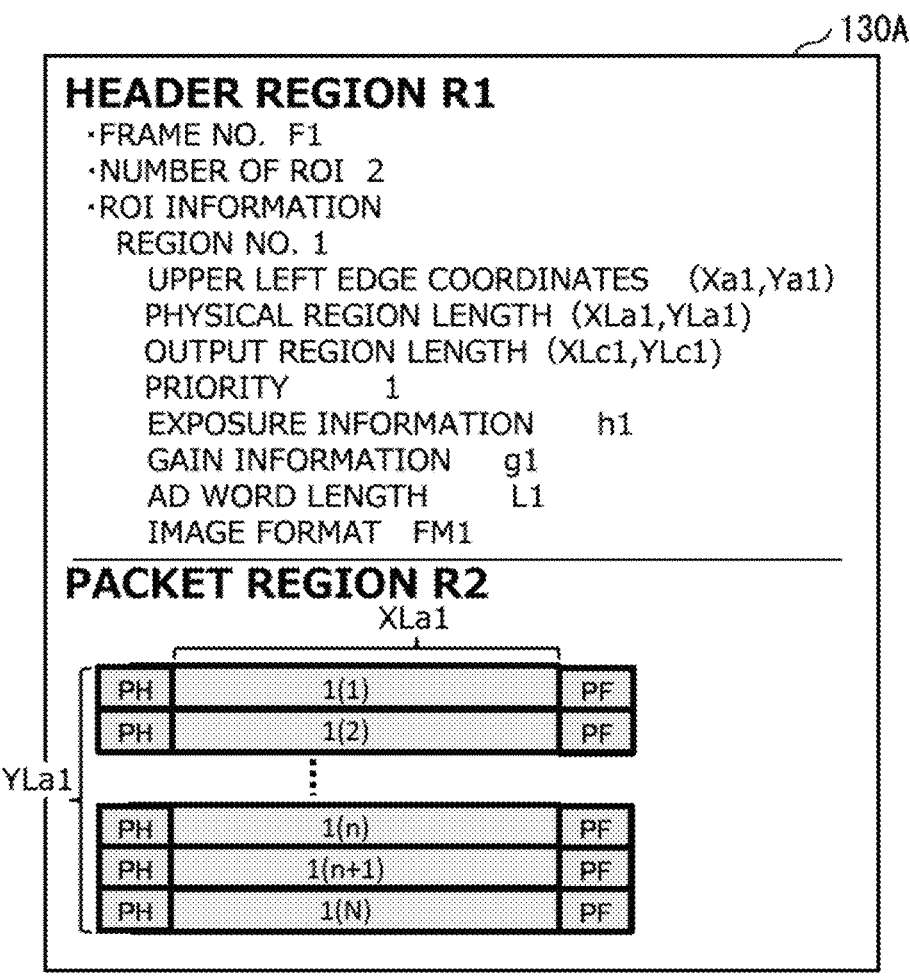
[FIG. 7]
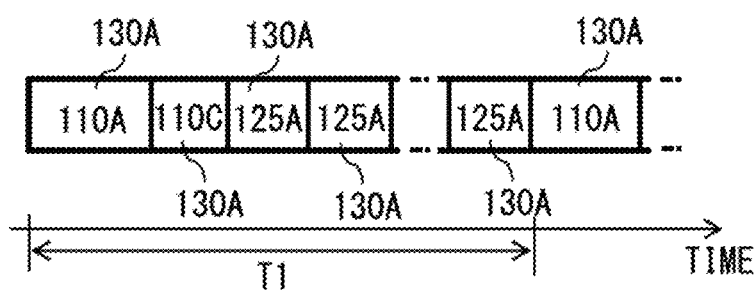

[FIG. 8]
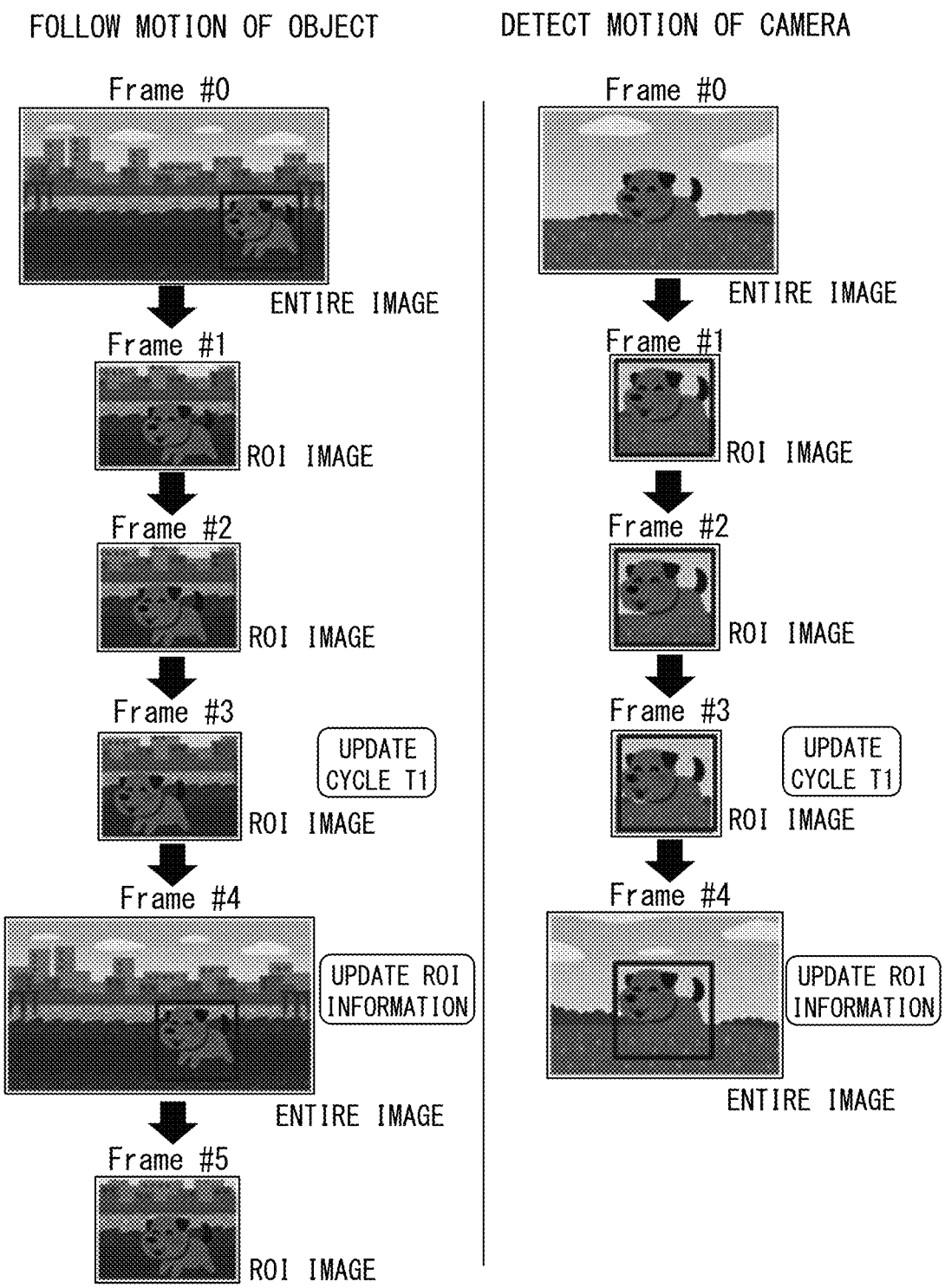

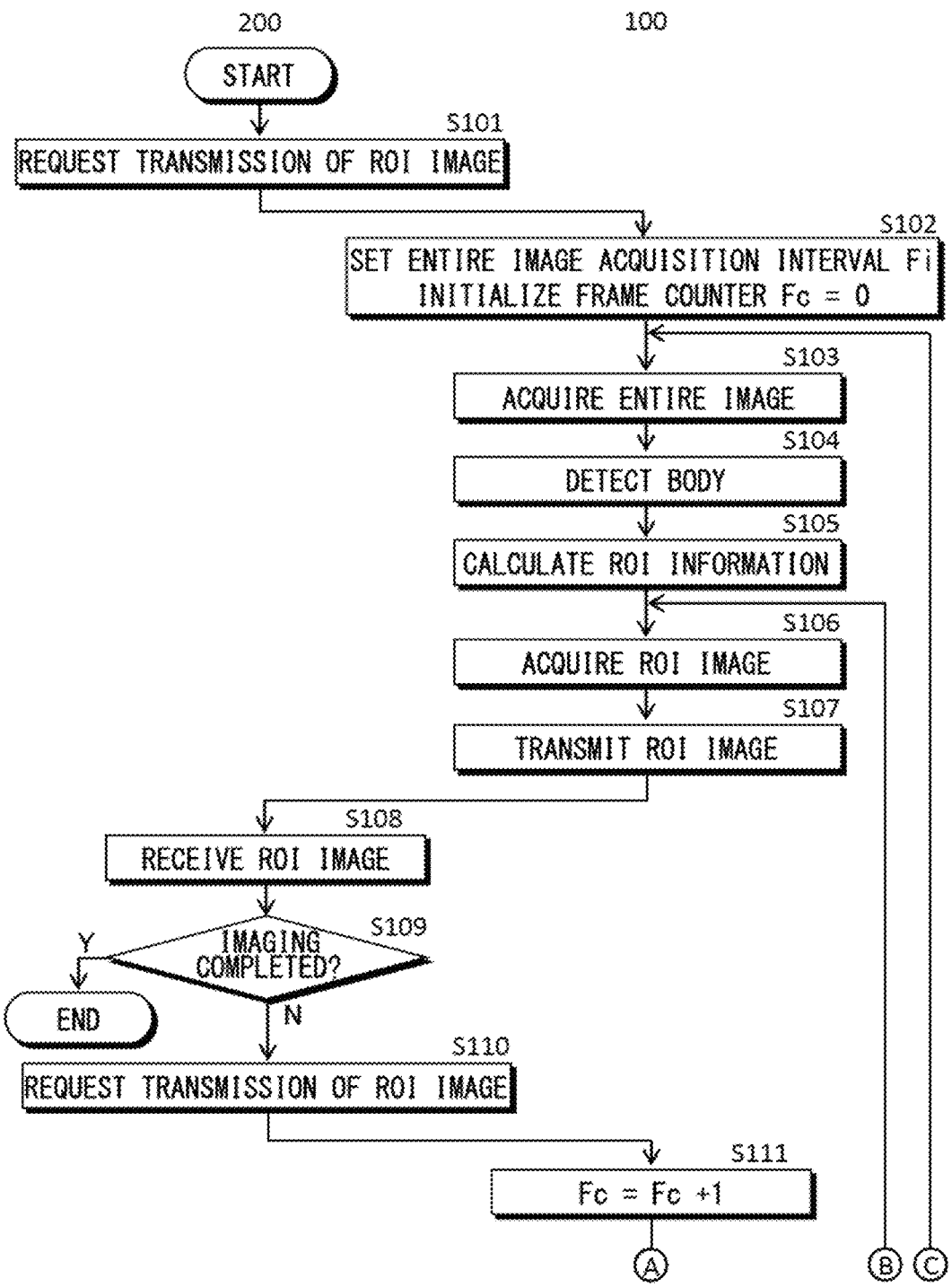
[FIG. 9]

[ FIG. 10 ]
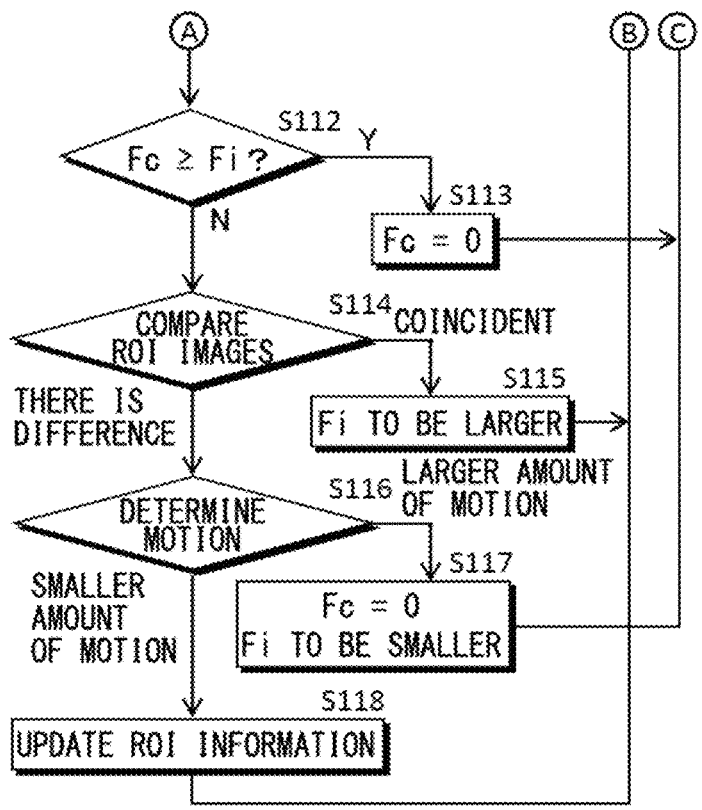

[FIG. 11]
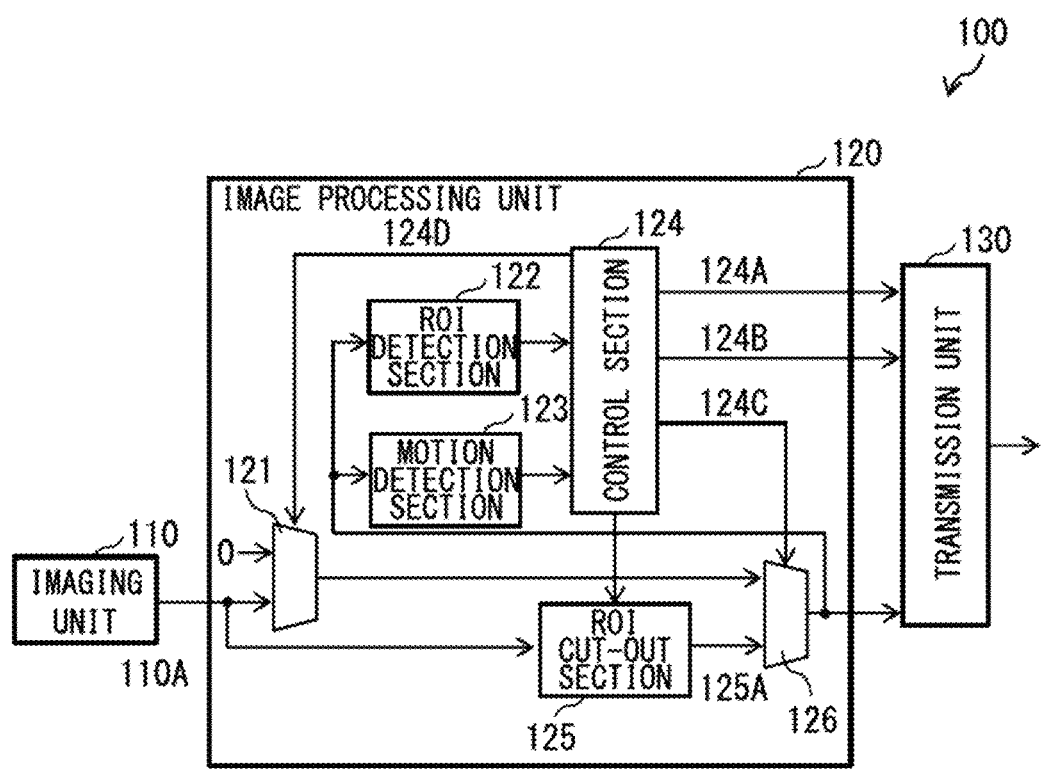

[ FIG. 12 ]
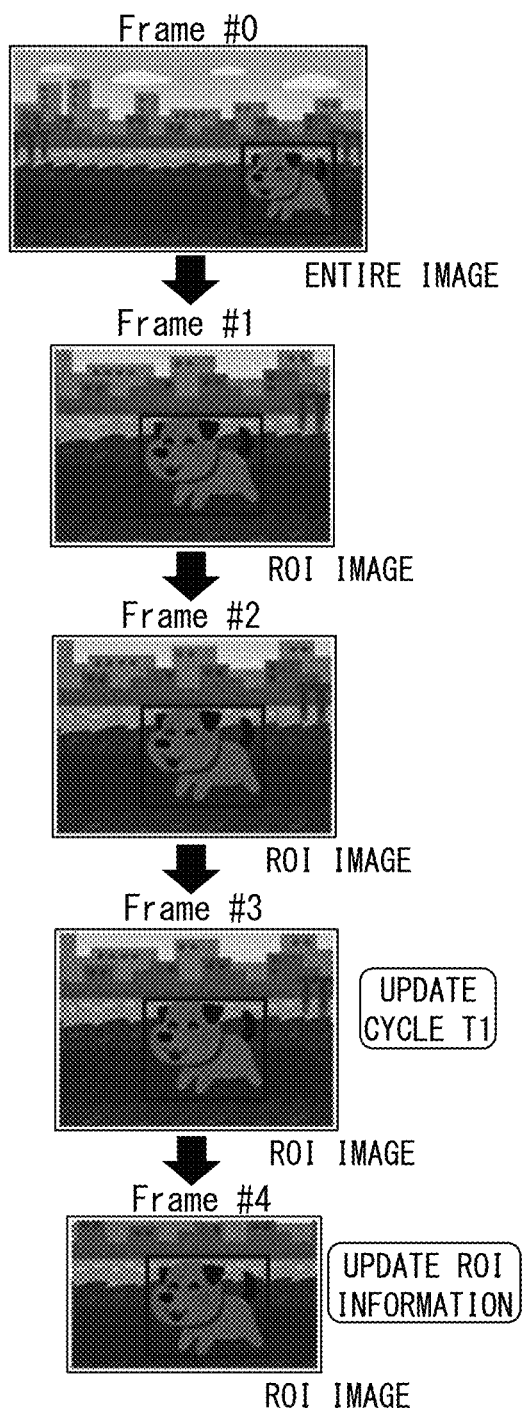
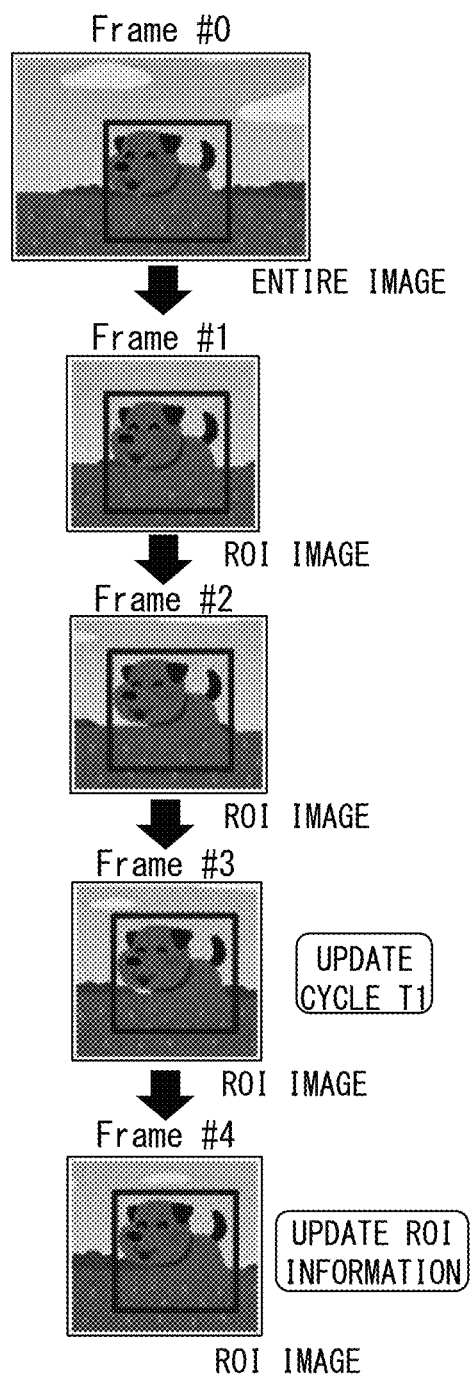

[ FIG. 13 ]
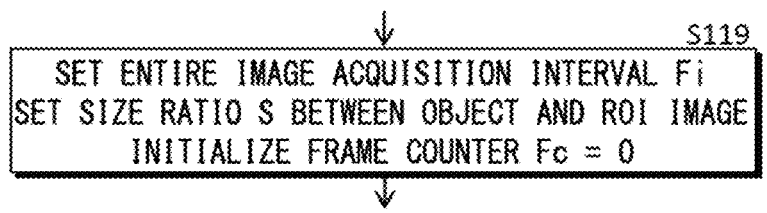
[ FIG. 14 ]
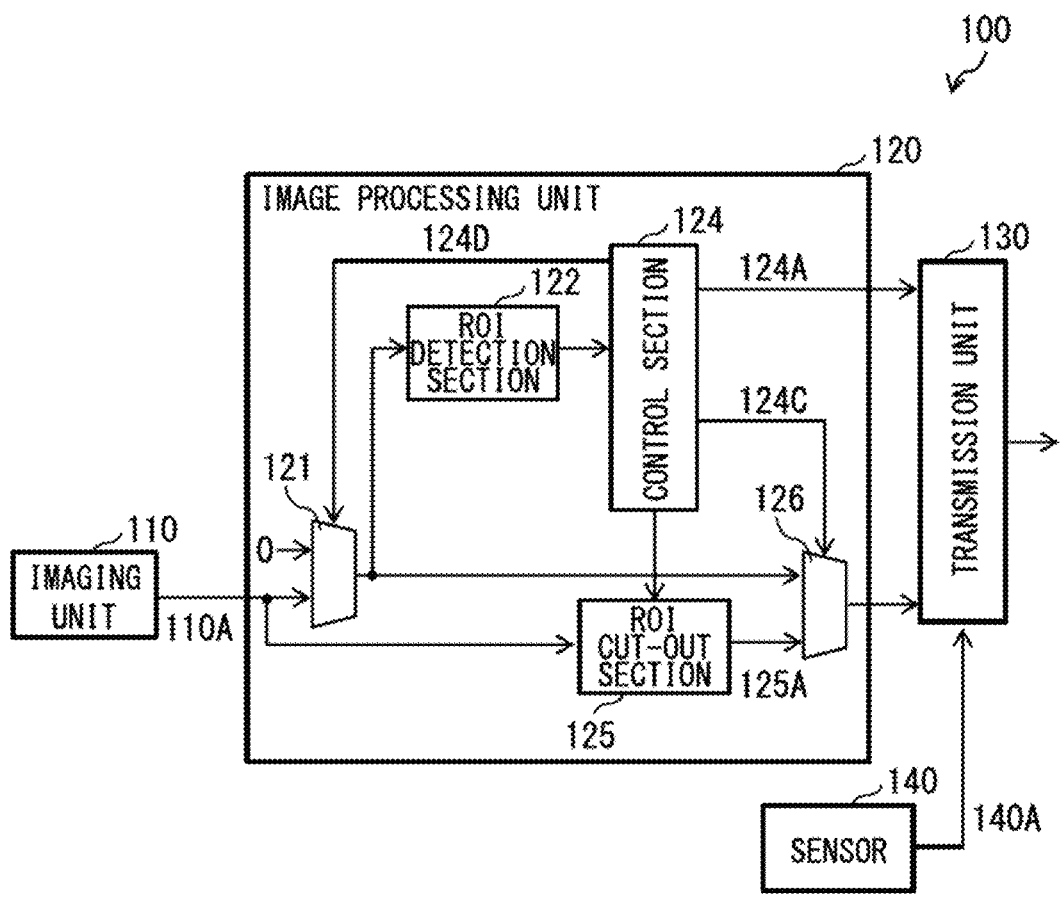

[ FIG. 15 ]
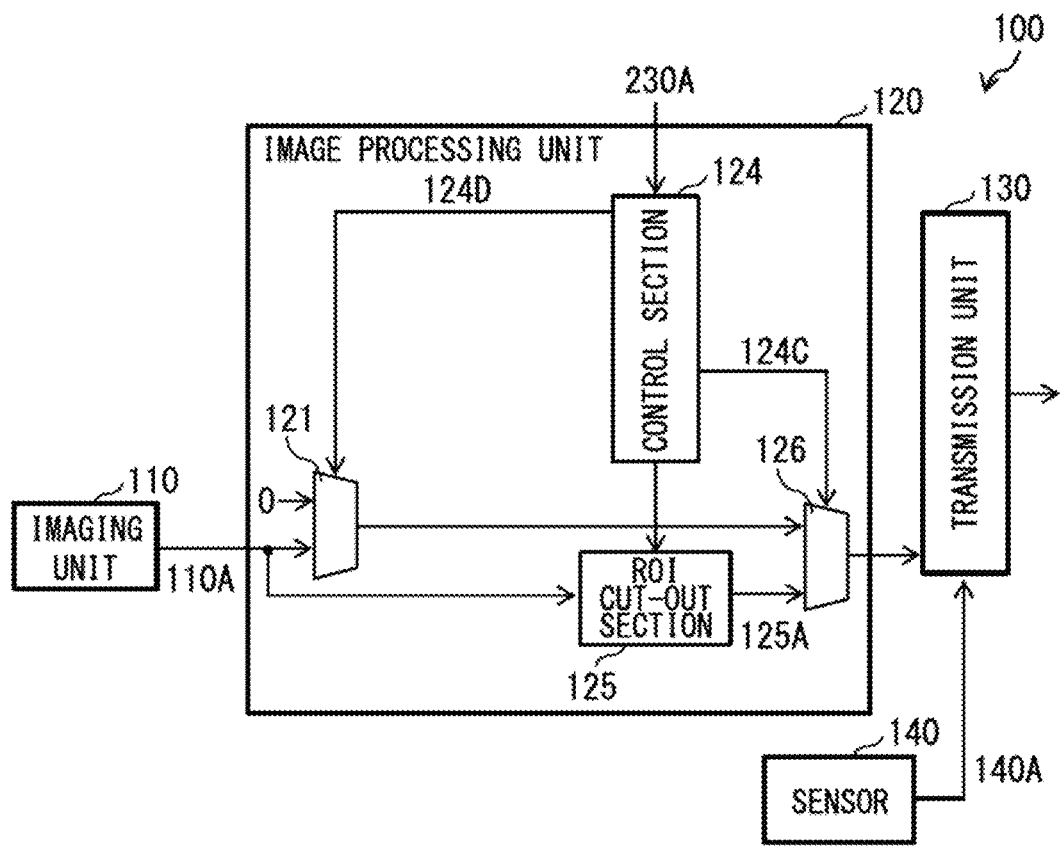
[ FIG. 16 ]
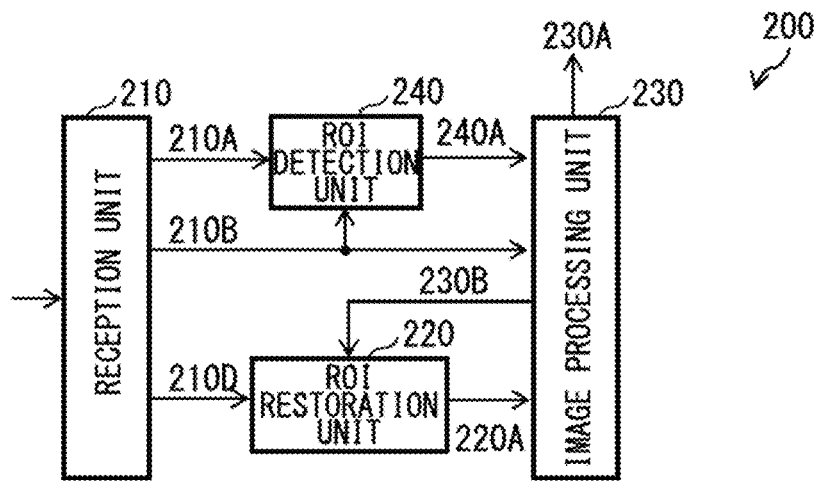

[ FIG. 17 ]
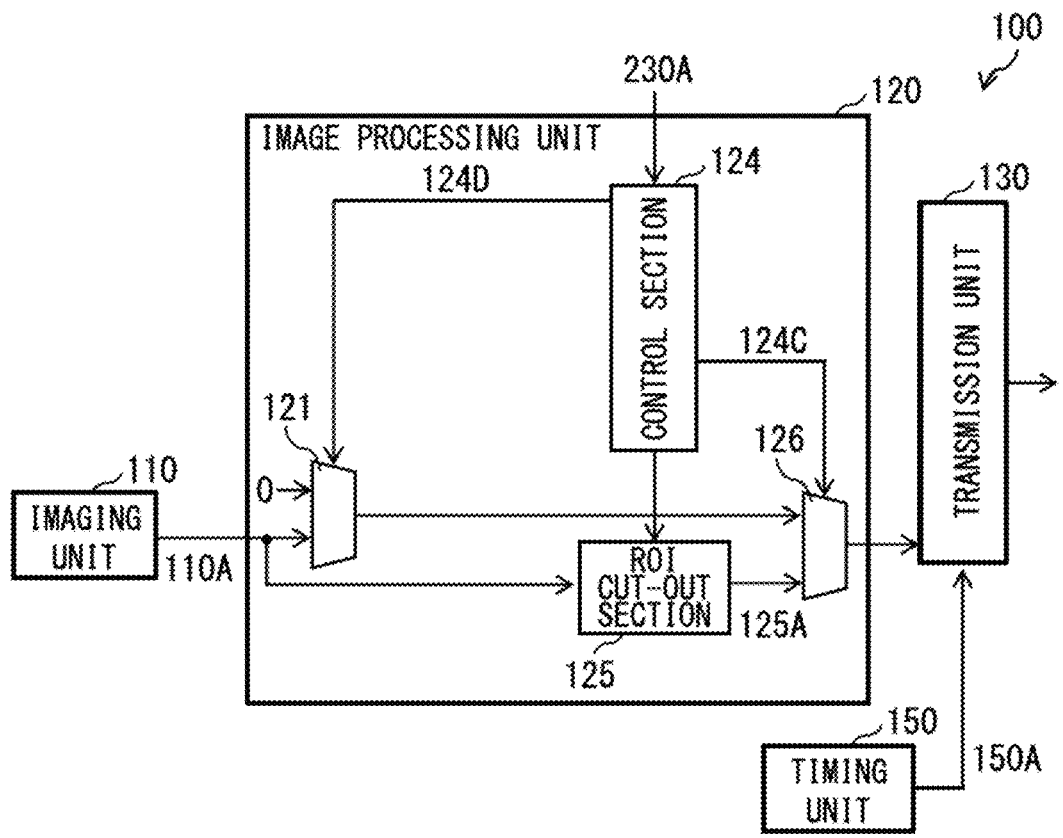
[ FIG. 18 ]
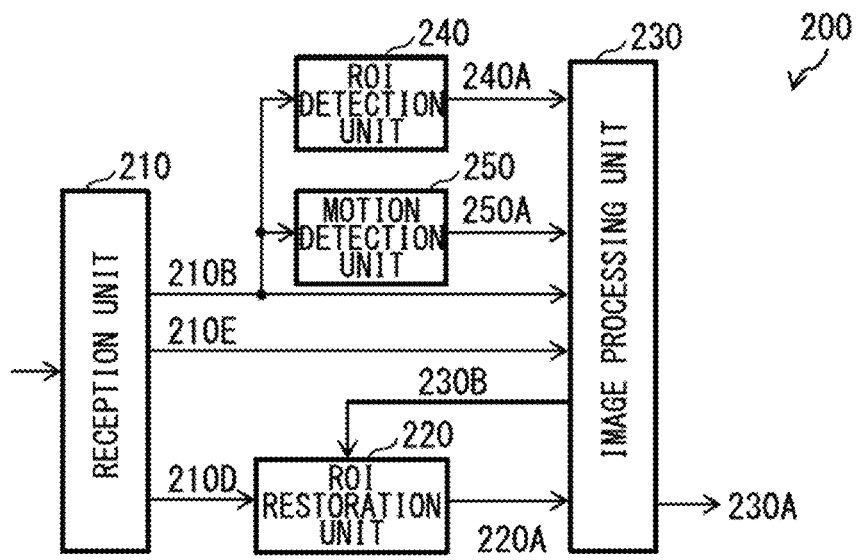

[ FIG. 19 ]
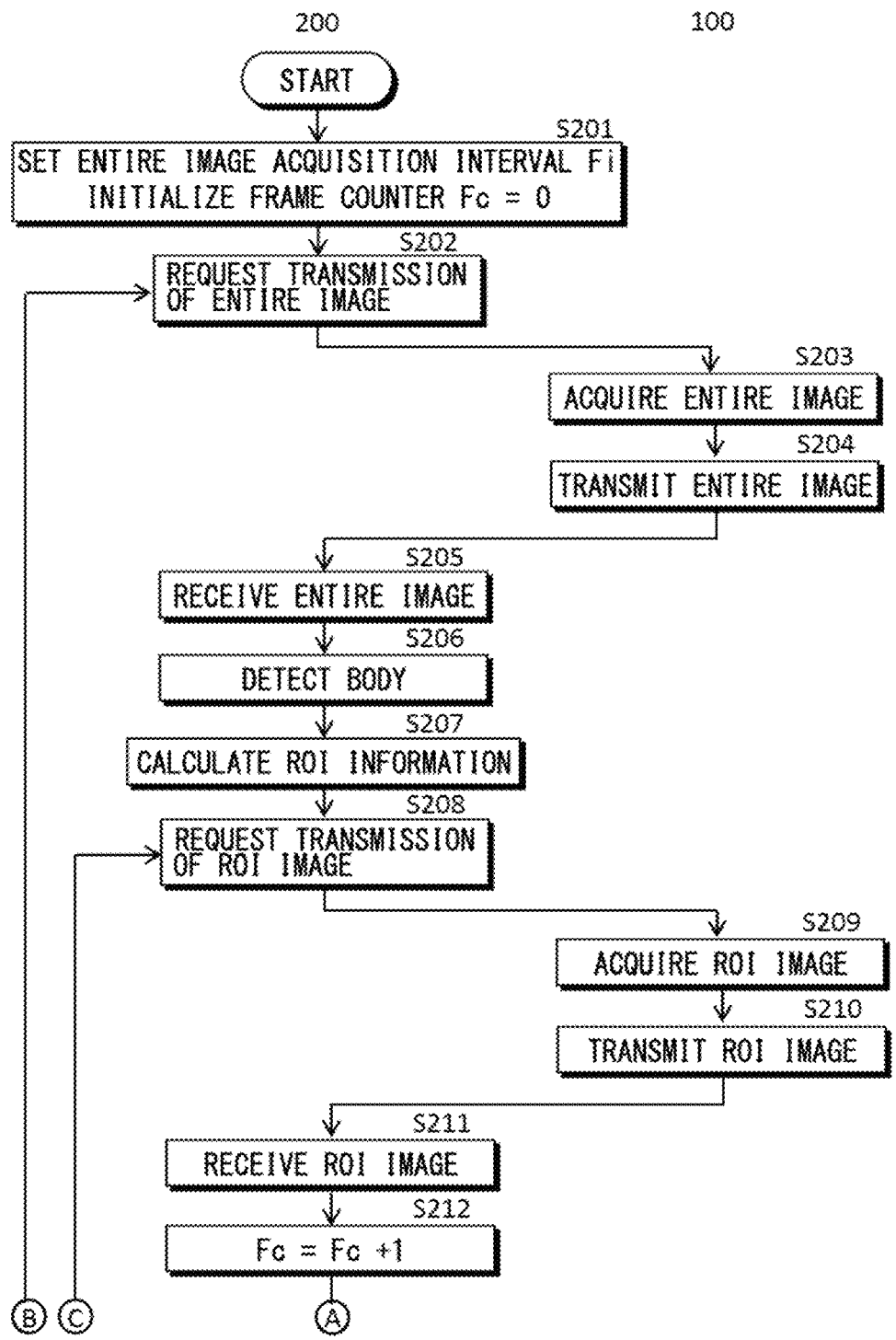

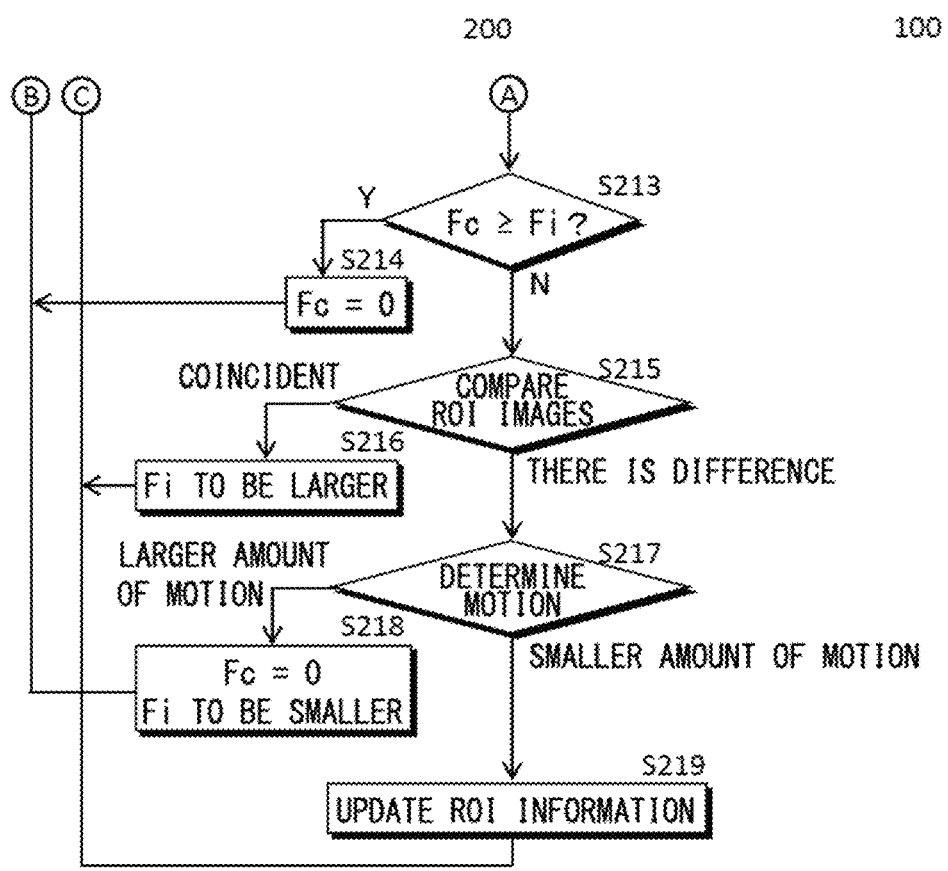
[ FIG. 20 ]

[ FIG. 21 ]
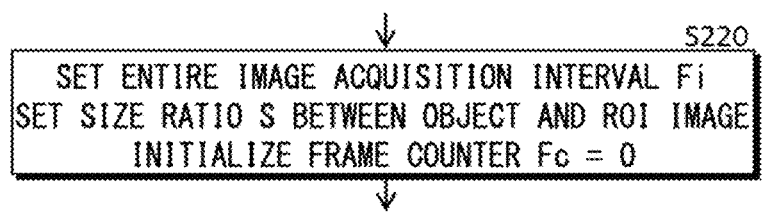
[ FIG. 22 ]
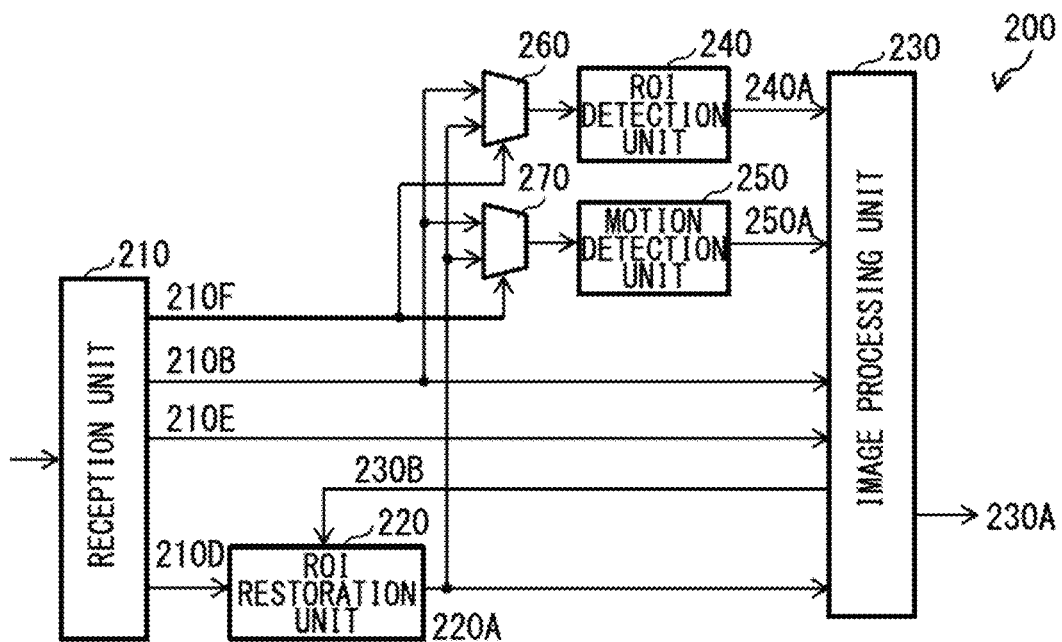

[ FIG. 23 ]
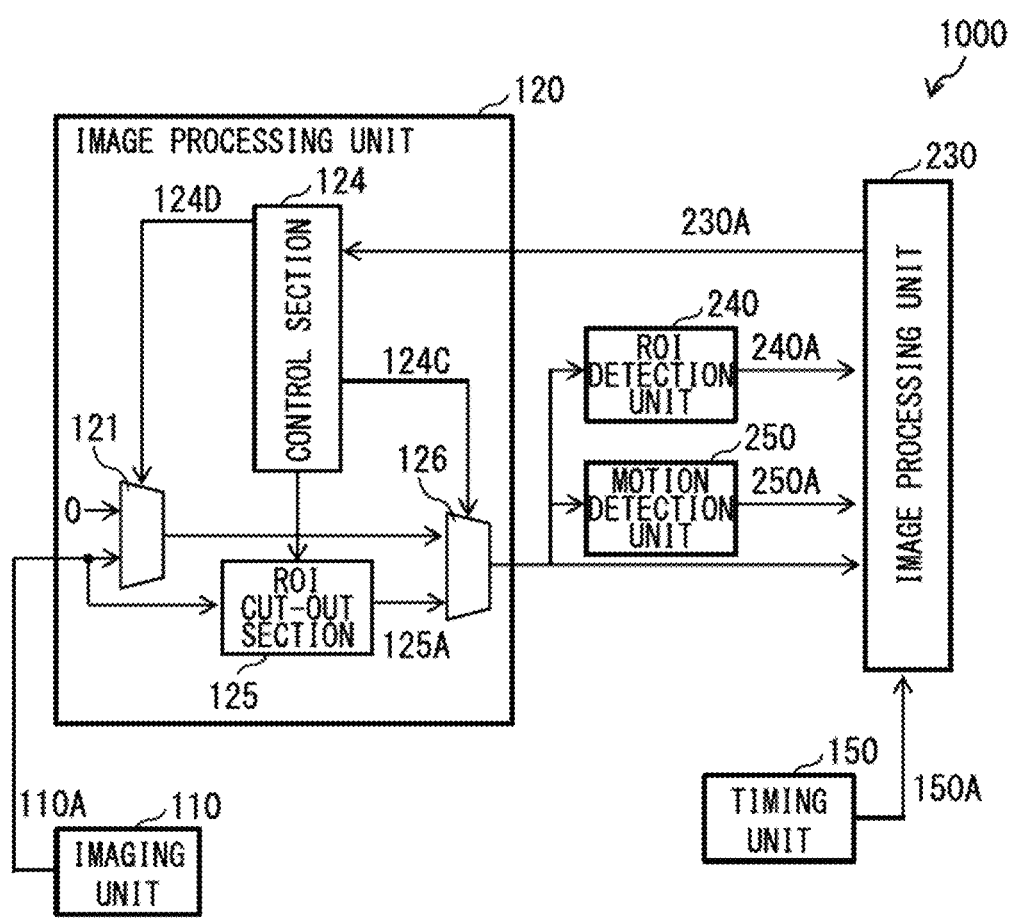

[ FIG. 24 ]
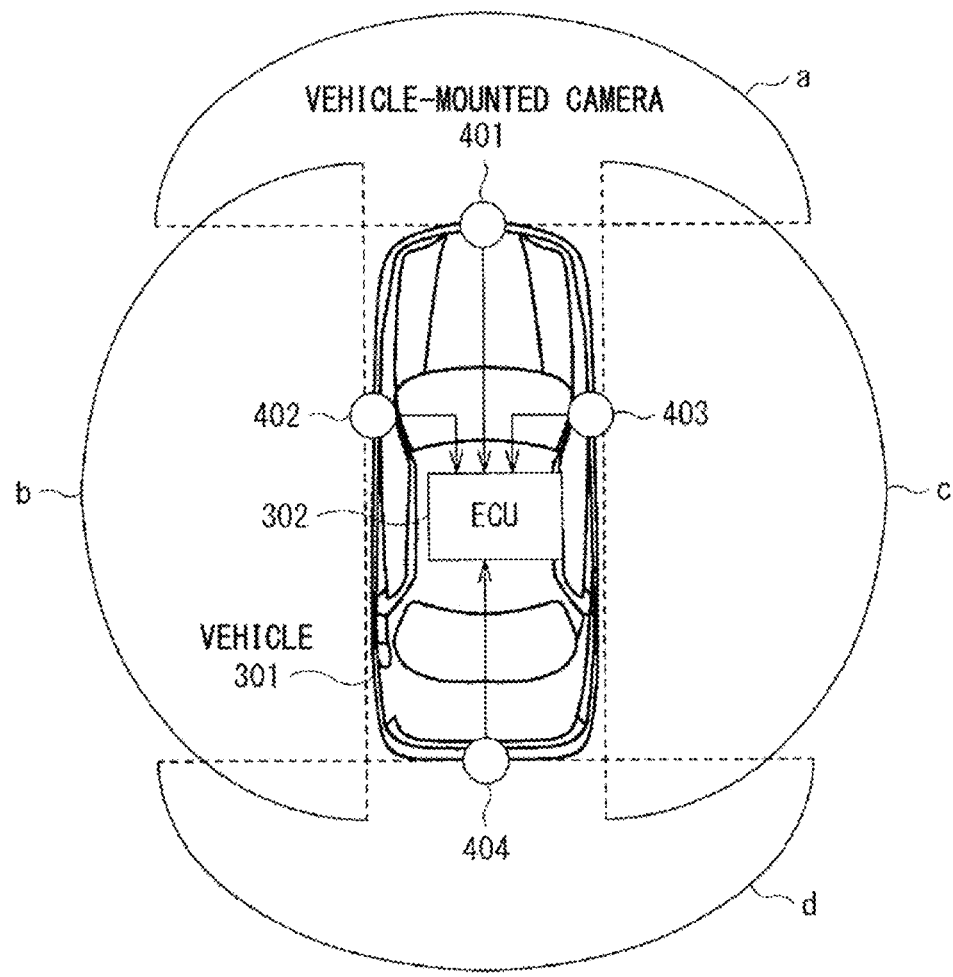
[ FIG. 25 ]
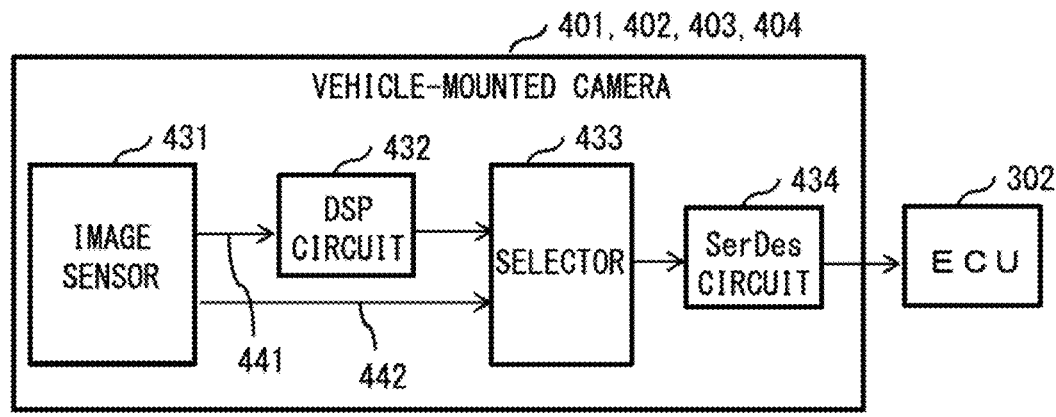

TRANSMITTER, RECEIVER, AND COMMUNICATION SYSTEM

TECHNICAL FIELD

The present disclosure relates to a transmitter, a receiver, and a communication system.

BACKGROUND ART

In recent years, applications for transmitting large amounts of data having a large data volume have been increasing. Transmission systems are likely to be heavily loaded, and in the worst case, there is a possibility that the transmission systems may go down and data transmission may not be performed.

In order to prevent the transmission systems from going down, for example, instead of transmitting the entirety of a photographed image, only a partial image obtained by specifying a body to be photographed and cutting out the specified body has been transmitted. It is to be noted that, for example, the following patent literatures describe the cutting out of a partial image from a photographed image.

CITATION LIST

Patent Literature

PTL 1: Japanese Unexamined Patent Application Publication No. 2016-201756
PTL 2: Japanese Unexamined Patent Application Publication No. 2014-39219
PTL 3: Japanese Unexamined Patent Application Publication No. 2013-164834
PTL 4: Japanese Unexamined Patent Application Publication No. 2012-209831

SUMMARY OF THE INVENTION

In general, it is assumed, in ROI transmission, that an imaging device is in a stationary state. Therefore, in a case where the imaging device is moved, a positional relationship between an original entire image and an ROI image results in being changed in association with the movement of the imaging device, thus making it difficult to appropriately transmit the ROI. It is desirable to provide a transmitter, a receiver, and a communication system that make it possible to appropriately transmit an ROI even in a case where an imaging device is moved.

A transmitter according to an embodiment of the present disclosure includes a detection section, a generation section, and a transmission unit. The detection section detects ROI (Region Of Interest) image data on the basis of ROI instruction information. The generation section generates ROI information from the ROI image data detected by the detection section. The transmission unit transmits the ROI image data and the ROI information to an external device. The detection section detects motion information on the detected ROI image data on the basis of one of a plurality of pieces of image data obtained at different imaging timings and a plurality of pieces of the ROI image data obtained at different imaging timings.

In the transmitter according to an embodiment of the present disclosure, motion information on the detected ROI image data is detected on the basis of one of a plurality of pieces of image data obtained at different imaging timings and a plurality of pieces of the ROI image data obtained at different imaging timings. This makes it possible to obtain the ROI image data with movement of the transmitter being taken into consideration, for example, even in a case where the transmitter is moved.

A first communication system according to an embodiment of the present disclosure includes a transmitter and a receiver. The transmitter includes a first transmission unit that selectively transmits, to the receiver, first image data obtained by imaging and ROI image data extracted from second image data obtained by imaging. The receiver includes a first generation section that generates motion information on the basis of one of a plurality of pieces of the first image data obtained at different imaging timings and a plurality of pieces of the ROI image data obtained at different imaging timings, a second generation section that generates ROI information in the second image data, and a second transmission unit that transmits the motion information and the ROI information to the transmitter. The transmitter further includes an extraction section that extracts the ROI image data from the second image data using the motion information and the ROI information.

In the first communication system according to an embodiment of the present disclosure, the first image data obtained by imaging and the ROI image data extracted from second image data obtained by imaging are selectively transmitted from the transmitter to the receiver. The motion information generated on the basis of one of the plurality of pieces of the first image data obtained at different imaging timings and the plurality of pieces of the ROI image data obtained at different imaging timings and the ROI information in the second image data are transmitted from the receiver to the transmitter. Then, in the transmitter, one or a plurality of pieces of the ROI image data are extracted from the second image data using the motion information and the ROI information. This makes it possible to obtain the ROI image data with movement of the transmitter being taken into consideration, for example, even in a case where the transmitter is moved.

A second communication system according to an embodiment of the present disclosure includes a transmitter and a receiver. The transmitter includes a first transmission unit that selectively transmits, to the receiver, first image data obtained by imaging and ROI image data extracted from second image data obtained by imaging. The receiver includes a first generation section that generates motion information on the basis of one of a plurality of pieces of the first image data having mutually different imaging timings and a plurality of pieces of the ROI image data obtained at different imaging timings, a second generation section that generates ROI information in the second image data using the motion information, and a second transmission unit that transmits the ROI information to the transmitter. The transmitter extracts the ROI image data from the second image data using the ROI information.

In the second communication system according to an embodiment of the present disclosure, first image data obtained by imaging and one or a plurality of pieces of the ROI image data extracted from second image data obtained by imaging are selectively transmitted from the transmitter to the receiver. The ROI information in the second image data, which is generated using the motion information generated on the basis of one of the plurality of pieces of the first image data having mutually different imaging timings and the plurality of pieces of the ROI image data obtained at different imaging timings, is transmitted from the receiver to the transmitter. Then, in the transmitter, the ROI image data is extracted from the second image data using the ROI information. This makes it possible to obtain the ROI image data with movement of the transmitter being taken into consideration, for example, even in a case where the transmitter is moved.

A third communication system according to an embodiment of the present disclosure includes a transmitter and a receiver. The transmitter includes a first transmission unit that transmits, to the receiver, ROI image data extracted from image data obtained by imaging. The receiver includes a generation section that generates ROI information in the image data, and a second transmission unit that transmits, to the transmitter, the motion information on the transmitter obtained by a sensor and the ROI information. The transmitter further includes an extraction section that extracts the ROI image data from the image data using the motion information and the ROI information.

In the third communication system according to an embodiment of the present disclosure, the ROI image data extracted from the image data obtained by imaging is transmitted from the transmitter to the receiver. The motion information on the transmitter obtained by the sensor and the ROI information in the image data are transmitted from the receiver to the transmitter. Then, in the transmitter, the ROI image data is extracted from the image data using the motion information and the ROI information. This makes it possible to obtain the ROI image data with movement of the transmitter being taken into consideration, for example, even in a case where the transmitter is moved.

A fourth communication system according to an embodiment of the present disclosure includes a transmitter and a receiver. The transmitter includes a first transmission unit that transmits, to the receiver, ROI image data extracted from image data obtained by imaging. The receiver includes a second generation section that generates ROI information in the image data using motion information on the transmitter obtained by a sensor, and a second transmission unit that transmits the ROI information to the transmitter. The transmitter extracts the ROI image data from the image data using the ROI information.

In the fourth communication system according to an embodiment of the present disclosure, the ROI image data extracted from the image data obtained by imaging is transmitted from the transmitter to the receiver. The ROI information in the image data is generated using the motion information on the transmitter obtained by the sensor, and is transmitted from the receiver to the transmitter. Then, in the transmitter, the ROI image data is extracted from the image data using the ROI information. This makes it possible to obtain the ROI image data with movement of the transmitter being taken into consideration, for example, even in a case where the transmitter is moved.

A receiver according to an embodiment of the present disclosure includes a reception unit, a detection section, a generation section, and a transmission unit. The reception unit receives image data. The detection section detects ROI image data from the received image data. The generation section generates ROI instruction information from the ROI image data detected by the detection section. The transmission unit transmits the ROI instruction information. Here, the detection section detects motion information on the detected ROI image data on the basis of one of a plurality of pieces of the image data obtained at different imaging timings and a plurality of pieces of the ROI image data obtained at different imaging timings.

In the receiver according to an embodiment of the present disclosure, the ROI instruction information is generated from the ROI image data detected from the received image data, and is transmitted. Further, the motion information on the detected ROI image data is detected on the basis of one of the plurality of pieces of the image data obtained at different imaging timings and the plurality of pieces of the ROI image data obtained at different imaging timings. This makes it possible to obtain the ROI image data with movement of the transmitter being taken into consideration, for example, even in a case where the transmitter is moved.

BRIEF DESCRIPTION OF THE DRAWINGS

FIG. 1 illustrates a schematic configuration example of a communication system.

FIG. 2 illustrates a schematic configuration example of an image sensor.

FIG. 3 illustrates a schematic configuration example of a processor.

FIG. 4 illustrates a configuration example of packets utilized in MIPI.

FIG. 5 illustrates a configuration example of transmission data utilized in MIPI.

FIG. 6 illustrates a configuration example of transmission data utilized in MIPI.

FIG. 7 illustrates a configuration example of transmission data.

FIG. 8 illustrates an example of states in which an ROI image is set by following motions of an object and motions of a camera are detected.

FIG. 9 illustrates an example of a procedure of data transmission in a communication system including the image sensor of FIG. 2 and the processor of FIG. 3.

FIG. 10 illustrates an example of a procedure subsequent to FIG. 9.

FIG. 11 illustrates a modification example of the schematic configuration of the image sensor.

FIG. 12 illustrates an example of states in which an ROI image is set by following motions of an object and motions of a camera are detected.

FIG. 13 illustrates an example of a procedure replaceable with S102 in the procedure illustrated in FIG. 9.

FIG. 14 illustrates a modification example of the schematic configuration of the image sensor.

FIG. 15 illustrates a modification example of the schematic configuration of the image sensor.

FIG. 16 illustrates an example of a schematic configuration of a processor in a communication system including the image sensor of FIG. 15.

FIG. 17 illustrates a modification example of the schematic configuration of the image sensor.

FIG. 18 illustrates an example of a schematic configuration of a processor in a communication system including the image sensor of FIG. 17.

FIG. 19 illustrates an example of a procedure of data transmission in a communication system including the image sensor of FIG. 17 and the processor of FIG. 16.

FIG. 20 illustrates an example of a procedure subsequent to FIG. 19.

FIG. 21 illustrates an example of a procedure replaceable with S201 in the procedure illustrated in FIG. 19.

FIG. 22 illustrates a modification example of the schematic configuration of the processor.

FIG. 23 illustrates a modification example of the schematic configuration of the communication system of FIG. 1.

FIG. 24 illustrates an example of installation of vehicle-mounted cameras to which the above-described communication system is applied.

FIG. 25 illustrates a configuration example in which the above-described communication system is applied to the vehicle-mounted camera.

MODES FOR CARRYING OUT THE INVENTION

Hereinafter, description is given in detail of embodiments of the present disclosure with reference to the drawings. The following description is given of specific examples of the present disclosure, and the present disclosure is not limited to the following aspects.

1. Embodiment

[Configuration]

FIG. 1 illustrates a schematic configuration example of a communication system 1000 according to the present embodiment. The communication system 1000 is applied to transmission of data signals, clock signals and control signals, and includes an image sensor 100 (transmitter) and a processor 200 (receiver).

The image sensor 100 and the processor 200 are electrically coupled to each other by a data bus B1. The data bus B1 is a single signal transmission path that couples the image sensor 100 and the processor 200 to each other. Data representing an image (hereinafter, referred to as "image data") to be transmitted from the image sensor 100 is transmitted from the image sensor 100 to the processor 200 via the data bus B1. The image sensor 100 and the processor 200 may be electrically coupled to each other by a bus (a control bus B2). The control bus B2 is another single signal transmission path that couples the image sensor 100 and the processor 200 to each other, and is a transmission path different from the data bus B1. Control data to be transmitted from the processor 200 is transmitted from the processor 200 to the image sensor 100 via the control bus B2.

The image sensor 100 has an imaging function and a transmission function, and transmits image data generated by imaging. The image sensor 100 serves as a transmitter in the communication system 1000. Examples of the image sensor 100 include any type of image sensor devices that are able to generate an image, such as "an imaging device, e.g., a digital still camera, a digital video camera, or a stereo camera", "an infrared sensor", or "a range image sensor", and the image sensor 100 has a function of transmitting the generated image. The image generated in the image sensor 100 corresponds to data indicative of a sensing result in the image sensor 100. Description is given later in detail of an example of a configuration of the image sensor 100 with reference to FIG. 2.

The image sensor 100 transmits data corresponding to a region set for the image data (hereinafter, also referred to as "region image data") by a transmission method described later. Control of transmission of the region image data is performed by, for example, a component (described later) that functions as an image processing unit in the image sensor 100. A region set for an image is called an ROI (Region Of Interest). In the following, a region set for the image is referred to as an "ROI". In addition, the region image data is referred to as "ROI image data".

Examples of processing related to setting of a region for the image include any processing that makes it possible to specify a partial region in the image (or any processing that makes it possible to cut out a partial region from the image), such as "processing of detecting a body from the image and setting a region including the detected body" or "processing of setting a region designated by an operation or the like on any operational device".

The image sensor 100 transmits the ROI image data, i.e., transmits a portion of the image data, to thereby allow an amount of data related to the transmission to be smaller than that in transmitting the entire image data. Therefore, the transmission of the ROI image data by the image sensor 100 achieves various effects brought about by reduction in the amount of data, such as, shortening of transmission time or reduction in the load associated with the transmission in the communication system 1000, for example. It is to be noted that the image sensor 100 is able to extract one or a plurality of ROI image data from the image data and to transmit the extracted one or the plurality of ROI image data, regardless of whether or not the image sensor 100 is moved. In addition, the image sensor 100 is also able to transmit the entire image data.

The processor 200 receives data transmitted from the image sensor 100, and processes the received data. The processor 200 serves as a receiver in the communication system 1000. An example of a configuration of processing of data transmitted from the image sensor 100 (configuration to serve as the receiver) is described later in detail with reference to FIG. 3.

The processor 200 includes, for example, one or two or more processors, which each include an arithmetic circuit such as MPU (Micro Processing Unit), or various processing circuits. The processor 200 performs various types of processing such as, processing related to control of recording of image data into a recording medium, processing related to control of image display on a display screen of a display device, and processing of executing arbitrary application software, for example. Examples of the processing related to the recording control include "processing of communicating, to the recording medium, control data including a recording command and data to be recorded into the recording medium". In addition, examples of the processing related to the display control include "processing of communicating control data including a display command and data to be displayed on a display screen to a display device". The processor 200 may transmit control information to the image sensor 100, for example, to thereby control functions in the image sensor 100. The processor 200 is also able to transmit region designation information to the image sensor 100, for example, to thereby control data transmitted from the image sensor 100.

(Packet Structure)

Next, description is given of an example of a structure of a packet to be utilized for transmitting an image from the image sensor 100 to the processor 200 in the communication system 1000. In the communication system 1000, image data captured by the image sensor 100 is divided into partial image data in a row unit, and the partial image data for each row is transmitted by utilizing one or more packets. The same holds true also for the ROI image data.

FIG. 4 illustrates an example of a structure of packets (Packet) to be utilized for transmitting image data in the communication system 1000. FIG. 4 illustrates an example of the structure of packets to be utilized in transmitting image data in accordance with MIPI CSI-2 specification or MIPI CSI-3 specification. FIGS. 5 and 6 each illustrate an example of transmission data 130A to be transmitted from the image sensor 100 to the processor 200 in the communication system 1000. FIGS. 5 and 6 each illustrate an example of the transmission data 130A utilized in transmitting image data in accordance with the MIPI CSI-2 specification or the MIPI CSI-3 specification.

As illustrated in FIG. 4, the packet to be utilized in transmitting the image data is started in a low power mode LP in a data stream, and is defined as a series of data ended in the low power mode LP. In addition, the packet includes a packet header PH, payload data (Payload Data), and a packet footer PF arranged in this order. The payload data (hereinafter, also referred to simply as "payload") includes pixel data of a partial image in a row unit.

The packet header PH is, for example, a packet header of Payload Data of Long Packet. The Long Packet refers to a packet arranged between the packet head PH and the packet footer PF. The Payload Data of the Long Packet refers to primary data transmitted between devices. The packet header PH includes, for example, DI, WC, and ECC. The DI is a region that stores a data identifier. The DI includes VC (virtual channel) number and Data Type (data type of each ROI). The VC is a concept introduced for packet flow control, and is a mechanism to support a plurality of independent data streams sharing the same link. The WC is a region for indicating, to the processor 200, the end of the packet by the number of words. The WC includes, for example, a Payload length. The Payload length is, for example, the number of bytes included in the Payload of the Long Packet, and is, for example, the number of bytes for each ROI. The ECC is a region that stores a value for correcting a bit error. The ECC includes an error-correcting code.

The transmission data 130A includes, for example, image data frames as illustrated in FIGS. 5 and 6. The image data frame typically includes a header region, a packet region, and a footer region. In FIGS. 5 and 6, illustration of the footer region is omitted for the sake of convenience. In the image data frame, a header region R1 includes Embedded Data. The Embedded Data refers to additional information embeddable in the header or footer of the image data frame. At this time, the Embedded Data includes frame numbers, the number of the ROIs, and ROI information.

The frame number is an identifier of the transmission data 130A. The number of the ROIs is the total number of ROIs included in the transmission data 130A. The ROI information is information about the ROI provided for each ROI included in the transmission data 130A.

The ROI information includes, for example, a region number (or priority) of one or a plurality of ROIs included in image data and positional information on one or a plurality of ROIs in the image data. The region number of the ROI is an identifier assigned to each ROI. The priority of the ROI is an identifier assigned to each ROI, and is determination information that makes it possible to determine which of the plurality of ROIs in the image data has been subjected to omission of an overlapped region.

The positional information on the ROI includes, for example, upper left edge coordinates (Xa, Ya) of the ROI, a length of the ROI in an X-axis direction length, and a length of the ROI in a Y-axis direction. The length of the ROI in the X-axis direction is, for example, a physical region length XLa of the ROI in the X-axis direction. The length of the ROI in the Y-axis direction is, for example, a physical region length YLa of the ROI in the Y-axis direction. The physical region length refers to a physical length (data length) of the ROI. The positional information on the ROI may include coordinates of a position different from the upper left edge of the ROI. The positional information on the ROI further includes, for example, an output region length XLc of the ROI in the X-axis direction and an output region length YLc of the ROI in the Y-axis direction. The output region length refers to, for example, a physical length (data length) of the ROI after a resolution thereof has been changed by performing thinning processing, pixel addition, or the like on the ROI.

The ROI information may further include, for each ROI, for example, sensing information, exposure information, gain information, AD (Analog-Digital) word length, image format, and the like, in addition to the positional information. The sensing information refers to contents of arithmetic operations on a body included in the ROI, supplementary information for subsequent-stage signal processing on the ROI image data, and the like. The exposure information refers to exposure time of the ROI. The gain information refers to gain information on the ROI. The AD word length refers to a word length of data per pixel having been AD-converted in the ROI. The image format refers to a format of the ROI image.

Further, as illustrated in FIGS. 5 and 6, in the data frame, a packet region R2 includes, for each line, the Payload Data of the Long Packet, and further includes the packet header PH and the packet footer PF at positions sandwiching the Payload Data of the Long Packet. Further, the low power modes LP are included at positions sandwiching the packet header PH and the packet footer PF.

In addition, the packet region R2 includes compressed image data 126A. The compressed image data 126A includes one piece of compressed image data or a plurality of pieces of compressed image data. The Payload Data of the Long Packet of each line includes pixel data for one line in the compressed image data 126A.

(Image Sensor 100)

FIG. 2 illustrates an example of a configuration of the image sensor 100. The configuration illustrated in FIG. 2 corresponds to a specific example of a CSI transmitter. The image sensor 100 includes, for example, an imaging unit 110, an image processing unit 120, and a transmission unit 130. The image sensor 100 transmits the transmission data 130A generated by performing predetermined processing on image data 110A obtained by the imaging unit 110, to the processor 200 via the data bus B1.

The imaging unit 110 converts an optical image signal obtained through an optical lens or the like, for example, into image data. The imaging unit 110 includes, for example, a CCD (Charge Coupled Device) image sensor or a CMOS (Complementary Metal Oxide Semiconductor) image sensor. The imaging unit 110 includes an analog-to-digital conversion circuit, and converts analog image data into digital image data. Data format after the conversion may be a YCbCr format in which a color of each pixel is represented by a luminance component Y and color-difference components Cb and Cr, or may be an RGB format. The imaging unit 110 outputs the image data 110A (digital image data) obtained by imaging to the image processing unit 120.

The image processing unit 120 includes, for example, a switch section 121, an ROI detection section 122, a motion detection section 123, a control section 124, an ROI cut-out section 125, and a switch section 126.

On the basis of a control signal 124D inputted from the control section 124, the switch section 121 controls an output of the image data 110A obtained by the imaging unit 110 to the switch section 126 in a subsequent stage. The control signal 124D is a signal for controlling a timing of acquiring the image data 110A, and is also a signal for controlling update timings of ROI information 122A, motion information 124B and a control signal 124C described later. The switch section 121 outputs the image data 110A at a predetermined cycle T1 in response to an input of the control signal 124D, for example.

The ROI detection section 122 detects one or a plurality of object regions (ROIs) included in the image data 110A. The ROI detection section 122 detects the ROI (ROI image data) using techniques such as moving object detection and face detection, for example. In the moving object detection, two classes of "being a moving object" and "not being a moving object" are defined. In the moving object detection, a feature amount is derived by luminance difference between the two pieces of image data 110A having mutually different imaging timings, and determination is made as to belonging to which class, depending on whether or not a magnitude of the derived feature amount exceeds a predetermined threshold value. Meanwhile, in the face detection, two classes of "being a face" and "not being a face" are defined. In the face detection, for example, determination is made as to belonging to which class, depending on whether or not a magnitude of Haar-Like feature amount in the image data 110A exceeds a predetermined threshold value.

The ROI detection section 122 generates the ROI information 122A on the basis of the ROI (ROI image data) obtained by the detection, and outputs the generated ROI information 122A to the control section 124. The ROI information 122A includes, for example, upper left edge coordinates of the ROI, a length of the ROI in the X-axis direction, and a length of the ROI in the Y-axis direction. The length of the ROI in the X-axis direction is, for example, a physical region length of the ROI in the X-axis direction. The length of the ROI in the Y-axis direction is, for example, a physical region length of the ROI in the Y-axis direction. The physical region length refers to a physical length (data length) of the ROI. The ROI information 122A may include coordinates at a position different from the upper left edge of the ROI. For example, the ROI detection section 122 may associate the generated ROI information 122A with an identifier (region number) assigned to the ROI to output the associated ROI information 122A to the control section 124.

The motion detection section 123 generates motion information 123A on the basis of a plurality of pieces of image data 110A obtained at mutually different imaging timings. The motion detection section 123 generates the motion information 123A on the basis of a difference generated between the plurality of pieces of image data 110A having mutually different imaging timings in association with movement of the image sensor 100. For example, the motion detection section 123 obtains a difference between the two pieces of image data 110A inputted from the switch section 121, for example, to thereby derive a motion amount (Mx, My) of a background of the image data 110A within a period corresponding to an acquisition cycle of the two pieces of image data 110A. The motion detection section 123 outputs, for example, the thus derived motion amount (Mx, My) as the motion information 123A to the control section 124.

The control section 124 generates the control signal 124D for controlling an acquisition timing (imaging cycle) of the image data 110A on the basis of the ROI information 122A inputted from the ROI detection section 122 and the motion information 123A inputted from the motion detection section 123. For example, when the motion amount (Mx, My) exceeds a predetermined threshold value (Thx, Thy) generated from the ROI information 122A, the control section 124 calculates a correction amount Tc corresponding to a difference between the motion amount (Mx, My) and the threshold value (Thx, Thy) to generate (correct) the cycle T1 using the calculated correction amount Tc. The control section 124 outputs the control signal 124D to the switch section 121, for example, at a timing based on the cycle T1 after the correction. For example, the control section 124 controls the cycle T1 to allow the cycle T1 to be longer than the imaging cycle of the image data 110A which is used in cutting out ROI image data 125A.

The control section 124 corrects (updates) the ROI information 122A inputted from the ROI detection section 122 on the basis of the motion information 123A inputted from the motion detection section 123. The control section 124 corrects (updates) the ROI information 122A from the ROI image data 125A detected by tracking of the ROI cut-out section 125. For example, when the motion amount (Mx, My) is equal to or less than the predetermined threshold value (Thx, Thy) generated from the ROI information 122A before the correction (i.e., when the cycle T1 is not changed), the control section 124 calculates a correction amount (Cx, Cy) corresponding to a difference between the motion amount (Mx, My) and the threshold value (Thx, Thy) to correct the ROI information 122A using the calculated correction amount (Cx, Cy). The control section 124 outputs the ROI information 122A after the correction to the ROI cut-out section 125, for example, at a timing based on the cycle T1 after the correction.

The control section 124 further outputs, as ROI information 124A, the ROI information 122A (the ROI information 122A after the correction) inputted from the ROI detection section 122 to the transmission unit 130. The control section 124 further outputs, as the motion information 124B, the motion information 123A inputted from the motion detection section 123 to the transmission unit 130.

The ROI cut-out section 125 cuts out one or a plurality of pieces of ROI image data 125A from the image data 110A inputted from the imaging unit 110 on the basis of the ROI information 122A inputted from the control section 124, for example. The ROI cut-out section 125 tracks the ROI image data 125A on the basis of the motion information 123A, for example. In a case where the ROI information 122A includes an identifier (region number) assigned to the ROI, the ROI cut-out section 125 assigns an identifier (region number) to the cut-out ROI image data 125A, for example. The ROI cut-out section 125 stores, in a storage section, the one or the plurality of pieces of ROI image data 125A cut out from the image data 110A, for example. The ROI cut-out section 125 further stores, in the storage section, an identifier (region number) in association with the ROI image data 125A, for example. The ROI cut-out section 125 outputs the one or the plurality of pieces of cut-out ROI image data 125A to the switch section 126.

Here, a size of the ROI image data 125A is a size equal to or more than a size corresponding to the positional information on the ROI. A length XLb of the ROI image data 125A in the X-axis direction A is a value equal to or more than the physical region length XLa of the ROI in the X-axis direction. The length YLb of the ROI image data 125A in the Y-axis direction is equal to or more than the physical region length YLa of the ROI in the Y-axis direction. The ROI cut-out section 125 sets the size of the ROI image data 125A on the basis of the ROI information 122A.

The switch section 126 selectively transmits, to the transmission unit 130, the image data 110A outputted from the imaging unit 110 and the one or the plurality of pieces of ROI image data 125A outputted from the ROI cut-out section 125, on the basis of the control signal 124C inputted from the control section 124. At this time, the switch section 126 encodes image data (the image data 110A or the one or the plurality of pieces of ROI image data 125A) to be transmitted, for example, to generate the compressed image data 126A. The switch section 126 compresses image data by, for example, a compression format or the like in conformity with JPEG specification. For example, the switch section 126 transmits the compressed image data 126A to the transmission unit 130.

The transmission unit 130 is a circuit that generates and sends the transmission data 130A including image data (the compressed image data 126A) inputted from the switch section 126 and the ROI information 122A and the motion information 124B inputted from the control section 124. That is, the transmission unit 130 selectively transmits, to the processor 200, the image data 110A and the one or the plurality of pieces of ROI image data 125A in a compressed state. For example, the transmission unit 130 sends, in the Embedded Data, the ROI information 122A and the motion information 124B. For example, the transmission unit 130 may transmit the ROI information 122A and the motion information 124B to the processor 200 through the control bus B2.

For example, the transmission unit 130 further sends, in the Payload Data of the Long Packet, image data (the compressed image data 126A) inputted from the switch section 126. For example, the transmission unit 130 sends, in the image data frame, the image data (the compressed image data 126A) inputted from the switch section 126, and sends, in a header of the image data frame, the ROI information 122A and the motion information 124B. In accordance with a rule defined by the MIPI CSI-2 specification or the MIPI CSI-3 specification, for example, the transmission unit 130 generates the transmission data 130A, and transmits the generated transmission data 130A to the processor 200 through the data bus B1.

For example, as illustrated in FIG. 7, the transmission unit 130 sends a plurality of pieces of compressed image data 126A obtained by compression of the image data 110A in the cycle T1. For example, as illustrated in FIG. 7, the transmission unit 130 further sends the plurality of pieces of compressed image data 126A obtained by compression of the one or the plurality of pieces of ROI image data 125A, in a cycle shorter than the cycle T1. Further, as illustrated in FIG. 7, for example, the transmission unit 130 may send an invalid frame 110C during a predetermined period from the sending of the plurality of pieces of compressed image data 126A obtained by the compression of the image data 110A to the sending of the compressed image data 126A obtained by the compression of the one or the plurality of pieces of ROI image data 125A.

(Processor 200)

FIG. 3 illustrates an example of a configuration of the processor 200. The configuration illustrated in FIG. 3 corresponds to a specific example of the CSI transmitter. The processor 200 includes, for example, a reception unit 210, an ROI restoration unit 220, and an image processing unit 230. The processor 200 performs predetermined processing on the transmission data 130A transmitted from the image sensor 100.

The reception unit 210 includes, for example, a header separation section, a header interpretation section, a Payload separation section, an EBD interpretation section, an ROI data separation section, a decoding section, and an information extraction section.

The header separation section receives the transmission data 130A via the data bus B1. The header separation section includes, for example, the ROI information 122A and the motion information 124B in the Embedded Data, and receives the transmission data 130A including the image data (the compressed image data 126A) in the Payload Data of the Long Packet. The header separation section separates the transmission data 130A in accordance with the rule defined by the MIPI CSI-2 specification or the MIPI CSI-3 specification, for example. The header separation section separates the received transmission data 130A into a header region and a packet region, for example.

For example, the header interpretation section specifies a position of the Payload Data of the Long Packet included in the packet region on the basis of data (specifically, the Embedded Data) included in the header region. For example, the Payload separation section separates the Payload Data of the Long Packet included in the packet region from the packet region on the basis of the position of the Payload Data of the Long Packet specified by the header interpretation section.

For example, the EBD interpretation section outputs the Embedded Data as EBD data to the data separation section. The EBD interpretation section further determines, from the data type included in the Embedded Data, for example, whether or not the image data included in the Payload Data of the Long Packet is the compressed image data 126A of the ROI image data. The EBD interpretation section outputs, for example, the determination result to the ROI data separation section.

For example, in a case where the image data included in the Payload Data of the Long Packet is the compressed image data 126A of the ROI image data, the ROI data separation section outputs, to the decoding section, the Payload Data of the Long Packet as Payload Data D1. In a case where the image data included in the Payload Data is the compressed image data 126A of normal image data (the image data 110A), the ROI data separation section outputs, to the decoding section, the Payload Data of the Long Packet as Payload Data D2.

The decoding section decodes the compressed image data 126A to generate image data. The decoding section decodes the compressed image data 126A included in the Payload Data D1, for example, to generate ROI image data 210D. The decoding section decodes the compressed image data 126A included in the Payload Data D2, for example, to generate entire image data 210B.

The information extraction section extracts the ROI information 122A and the motion information 124B, for example, from the Embedded Data included in the EBD data. The information extraction section extracts the number of the ROIs included in image data 111A, the region number of each ROI, the data length of each ROI, and the image format of each ROI, for example, from the Embedded Data included in the EBD data.

The reception unit 210 outputs, for example, the obtained motion information 124B as motion information 210A to the image processing unit 230. The reception unit 210 outputs the obtained entire image data 210B, for example, to the image processing unit 230. The reception unit 210 outputs, for example, the obtained ROI information 122A as ROI information 210C to the ROI restoration unit 220. The reception unit 210 outputs, for example, the obtained ROI image data 210D to the ROI restoration unit 220.

The ROI restoration unit 220 generates (restores) the one or the plurality of pieces of ROI image data 125A included in the image data 110A, for example, on the basis of the ROI image data 210D obtained by decoding, the ROI information 210C, and the like. The ROI restoration unit 220 outputs, for example, the one or the plurality of pieces of ROI image data 125A obtained by the generation (restoration), as ROI image data 220A, to the image processing unit 230.

The image processing unit 230 performs predetermined processing using the motion information 210A and the entire image data 210B inputted from the reception unit and using the ROI image data 220A inputted from the ROI restoration unit 220.

[Operation]

Next, description is given of a procedure of data transmission in the communication system 1000. FIG. 8 illustrates an example of states in which an ROI image is set by following motions of an object and motions of a camera are detected. FIGS. 9 and 10 illustrate an example of the procedure of the data transmission in the communication system 1000.

First, the processor 200 requests the image sensor 100 to transmit ROI image data (step S101). Then, the image sensor 100 sets an interval at which entire image data is acquired (an entire image acquisition interval Fi) to an initial value, and further initializes a frame counter Fc (Fc=0) (step S102). The entire image acquisition interval Fi is a parameter corresponding to the cycle T1 described above.

Next, the image sensor 100 acquires the image data 110A which is the entire image (step S103). The image data 110A at this time is, for example, image data of Frame #0 at the upper left of FIG. 8 or image data of Frame #0 at the upper right of FIG. 8. The image sensor 100 outputs the control signal 124D, for example, from the control section 124 to the switch section 121 to thereby output the image data 110A from the switch section 121. Next, the image sensor 100 detects one or a plurality of bodies (objects) included in the image data 110A (step S104). Specifically, the image sensor 100 detects the one or the plurality of object regions (ROIs) included in the image data 110A.

Next, the image sensor 100 calculates ROI information (step S105). Specifically, the image sensor 100 calculates positional information on the ROI (ROI information 122A) obtained by the detection. Next, the image sensor 100 acquires the ROI image (step S106). Specifically, the image sensor 100 cuts out the one or the plurality of pieces of ROI image data 125A from the image data 110A inputted from the imaging unit 110 on the basis of the acquired ROI information 122A. The image sensor 100 transmits the acquired ROI image to the processor 200 (step S107).

The processor 200 receives the ROI image from the image sensor 100 (step S108). At this time, the processor 200 determines whether or not an instruction to complete photographing is inputted (step S109). In a case where the instruction to complete the photographing is inputted, the processor 200 ends the operation. In a case where the instruction to complete the photographing is not inputted, the processor 200 requests the image sensor 100 to transmit the ROI image data again (step S110).

Then, the image sensor 100 increments the frame counter Fc by one (step S111). Next, the image sensor 100 determines whether or not the frame counter Fc is equal to or more than the entire image acquisition interval Fi (step S112). In a case where the frame counter Fc is equal to or more than the entire image acquisition interval Fi, the image sensor 100 resets the frame counter Fc to zero (step S113). At this time, the image sensor 100 proceeds to step S103.

Meanwhile, in a case where the frame counter Fc is not equal to or more than the entire image acquisition interval Fi, the image sensor 100 compares the ROI images (step S114). The image sensor 100 determines, in the two pieces of image data 110A having mutually different imaging timings, whether there is no difference between two pieces of ROI image data 125A in which mutually common objects are reflected (two pieces of the ROI image data 125A having mutually equal ROI information) or whether or not the difference falls within a predetermined range. The pieces of the ROI image data 125A at this time are, for example, pieces of image data of Frames #2 and #3 on left side of FIG. 8 or pieces of image data of Frames #2 and #3 on right side of FIG. 8. As a result, in a case where there is no difference or the difference falls within a predetermined range as described above, the image sensor 100 determines that the ROI images are coincident with each other, and changes the entire image acquisition interval Fi to a value larger than the current value (step S115). At this time, the image sensor 100 proceeds to step S106. Meanwhile, in a case where the above difference deviates from within the predetermined range, the image sensor 100 determines that there is a difference between the ROIs, and proceeds to motion determination (step S116).

In the motion determination, the image sensor 100 obtains a difference between the two pieces of image data 110A inputted from the switch section 121, for example, to thereby derive the motion amount (Mx, My) of a background of the image data 110A within a period corresponding to an acquisition cycle of the two pieces of image data 110A. The pieces of image data 110A at this time are, for example, pieces of image data of Frames #1 and #4 on the left side of FIG. 8 or pieces of image data of Frames #1 and #4 on the right side of FIG. 8. In a case where the derived motion amount (Mx, My) is large, specifically, in a case where the motion amount (Mx, My) exceeds the predetermined threshold value (Thx, Thy) generated from the ROI information 122A, the image sensor 100 resets the frame counter Fc to zero, and changes the entire image acquisition interval Fi to a value smaller than the current value (step S117). At this time, the image sensor 100 proceeds to step S103. Meanwhile, in a case where the motion amount (Mx, My) is small in the motion determination, specifically, in a case where the motion amount (Mx, My) does not exceed the predetermined threshold value (Thx, Thy) generated from the ROI information 122A, the image sensor 100 updates the ROI information (step S118). At this time, the image sensor 100 proceeds to step S106.

For example, when the motion amount (Mx, My) is equal to or less than the predetermined threshold value (Thx, Thy) generated from the ROI information 122A before the correction (i.e., when the entire image acquisition interval Fi is not changed), the image sensor 100 calculates the correction amount (Cx, Cy) corresponding to a difference between the motion amount (Mx, My) and the threshold value (Thx, Thy) to correct the ROI information 122A using the calculated correction amount (Cx, Cy). At this time, the image sensor 100 proceeds to step S106. In the present embodiment, for example, the cycle T1 and the ROI information 122A are corrected (updated) in this manner.

[Effects]

Next, description is given of effects of the communication system 1000 according to the present embodiment.

In recent years, applications for transmitting large amounts of data having a large data volume have been increasing. Transmission systems are likely to be heavily loaded, and in the worst case, there is a possibility that the transmission systems may go down and data transmission may not be performed.

In order to prevent the transmission systems from going down, for example, instead of transmitting the entirety of a photographed image, only a partial image obtained by specifying a body to be photographed and cutting out the specified body has been transmitted.

In general, it is assumed, in ROI transmission, that an imaging device is in a stationary state. Therefore, in a case where the imaging device moves, a positional relationship between an original entire image and an ROI image results in being changed in association with the motion of the imaging device, thus making it difficult to appropriately transmit the ROI.

Meanwhile, in the image sensor 100 according to the present embodiment, the motion information 124B is detected on the basis of the plurality of pieces of image data 110A obtained at different imaging timings. This makes it possible, for example, even in a case where the image sensor 100 is moved, to obtain the ROI image data 125A with the movement of the image sensor 100 being taken into consideration. Accordingly, it is possible to appropriately transmit the ROI even in a case where the image sensor 100 is moved.

Further, in the image sensor 100 according to the present embodiment, the motion information 124B is detected on the basis of the difference generated between the plurality of pieces of image data 110A in association with the movement of the image sensor 100. This makes it possible, for example, even in a case where the image sensor 100 is moved, to obtain the ROI image data 125A with the movement of the image sensor 100 being taken into consideration. Accordingly, it is possible to appropriately transmit the ROI even in a case where the image sensor 100 is moved.

In the image sensor 100 according to the present embodiment, the motion information 124B is generated using the image data 110A which is used upon the generation of the ROI image data 125A. This makes it possible to generate the motion information 124B with higher accuracy than the case where the motion information on the image sensor 100 is generated using the ROI image data 125A.

In addition, in the image sensor 100 according to the present embodiment, the imaging cycle (the cycle T1) of the image data 110A is controlled on the basis of the motion information 124B. This makes it possible to suppress at least a portion of an object being missing from the ROI image data 125A. Accordingly, it is possible to appropriately transmit the ROI even in a case where the image sensor 100 is moved.

Further, in the image sensor 100 according to the present embodiment, the cycle T1 is controlled to allow the cycle T1 to be longer than the imaging cycle of the image data 110A which is used in cutting out the ROI image data 125A. This eliminates the necessity of the image data 110A as the entire image for each frame, thus making it possible to reduce the amount of data transfer and the amount of arithmetic operation as compared with the case where the cycle T1 is controlled for each frame.

2. Modification Examples

Modification Example A

In the foregoing embodiment, the size of the ROI image data 125A is set on the basis of the ROI information 122A. Here, in a case where the size of the ROI image data 125A is too large, the data size of the ROI image data 125A results in being too large as well. Therefore, the size of the ROI image data 125A is usually a value equal to or slightly larger than a size corresponding to positional information on the ROI.

However, in the foregoing embodiment, there may be a case where the amount of the movement of the object is large enough to cause at least a portion of the object to be missing from the ROI image data 125A until the entire image (the image data 110A) is acquired next. In such a case, the ROI cut-out section 125 may change, for example, the size of the ROI image data 125A in accordance with the magnitude of the amount of the movement of the object (e.g., the magnitude of the amount of the movement of the object within the cycle T1).

In the present modification example, as illustrated in FIG. 11, for example, an output of the switch section 126 may be inputted to the ROI detection section 122 and the motion detection section 123. At this time, the ROI detection section 122 detects one or a plurality of object regions (ROIs) included in one of the image data 110A and the ROI image data 125A. The motion detection section 123 generates the motion information 123A on the basis of one of the plurality of pieces of image data 110A having mutually different imaging timings and the plurality of pieces of ROI image data 125A having mutually different imaging timings. The motion detection section 123 generates the motion information 123A on the basis of a difference, which is generated between one of the plurality of pieces of ROI image data 125A having mutually different imaging timings and the plurality of pieces of ROI image data 125A having mutually different imaging timings in association with the movement of the image sensor 100.

For example, as illustrated in FIG. 12, in the ROI cut-out section 125, the size of the ROI image data 125A may be made larger than the size thereof in the foregoing embodiment. At this time, the image sensor 100 may execute a series of procedures of data transmission in the communication system 1000 after replacing step S102 of FIG. 8 with step S119 described in FIG. 13. In step S119, the image sensor 100 executes the procedure described in step S102, and sets a size ratio s between the object and the ROI image. In step S115 of FIG. 10, the image sensor 100 may further make the entire image acquisition interval Fi larger, and make the size ratio s smaller. In step S117 of FIG. 10, the image sensor 100 may further make the entire image acquisition interval Fi smaller, and make the size ratio s larger.

In this manner, in the present modification example, the size of the ROI image data 125A is controlled. This makes it possible to suppress at least a portion of the object being missing from the ROI image data 125A. Accordingly, it is possible to appropriately transmit the ROI even in a case where the image sensor 100 is moved.

In the present modification example, the ROI image data 125A is tracked on the basis of the motion information 123A, and the ROI information 122A is corrected (updated) from the ROI image data 125A detected by the tracking. This makes it possible, for example, even in a case where the image sensor 100 is moved, to obtain the ROI image data 125A with the movement of the image sensor 100 being taken into consideration. Accordingly, it is possible to appropriately transmit the ROI even in a case where the image sensor 100 is moved.

Modification Example B

In the foregoing embodiment and Modification Example A, as illustrated in FIG. 14, for example, the image sensor 100 may include, for example, a sensor 140 instead of the motion detection section 123. The sensor 140 is a device that is able to detect a motion of the image sensor 100 to thereby generate the motion information 123A, and includes, for example, a gyro sensor, an angular velocity sensor, a GPS receiver, and the like.

The sensor 140 outputs the generated motion information 123A as an output 140A to the transmission unit 130. At this time, the transmission unit 130 generates and sends the transmission data 130A including the output 140A instead of the motion information 124B. This enables the output 140A to be communicated to the processor 200 by the transmission of the transmission data 130A, thus enabling the image processing unit 230 to perform processing in consideration of the output 140A.

In the present modification example, the sensor 140 is provided instead of the motion detection section 123. Even in such a case, it is possible to achieve effects similar to those of the foregoing embodiment.

Modification Example C

In the foregoing embodiment and Modification Example A, as illustrated in FIG. 15, for example, the ROI detection section 122 and the motion detection section 123 may be omitted, and the sensor 140 may be provided. Further, in the foregoing embodiment and Modification Example A, as illustrated in FIG. 16, for example, an ROI detection unit 240 may be provided.

The ROI detection unit 240 detects one or a plurality of object regions (ROIs) included in the entire image data 210B. The ROI detection unit 240 detects the ROI (e.g., ROI image data) using techniques such as moving object detection and face detection, for example. In the moving object detection, two classes of "being a moving object" and "not being a moving object" are defined. In the moving object detection, a feature amount is derived by luminance difference between the two pieces of entire image data 210B having mutually different imaging timings, and determination is made as to belonging to which class, depending on whether or not a magnitude of the derived feature amount exceeds a predetermined threshold value. Meanwhile, in the face detection, two classes of "being a face" and "not being a face" are defined. In the face detection, for example, determination is made as to belonging to which class, depending on whether or not a magnitude of Haar-Like feature amount in the entire image data 210B exceeds a predetermined threshold value.

The ROI detection unit 240 calculates the ROI information 122A on the basis of the ROI (e.g., ROI image data) obtained by the detection, and outputs the calculated ROI information 122A as ROI information 240A to the image processing unit 230. For example, the ROI detection unit 240 may associate the ROI information 240A with an identifier (region number) assigned to the ROI to output the associated ROI information 240A to the image processing unit 230.

On the basis of the ROI information 122A and the motion information 210A inputted from the reception unit 210, the ROI detection unit 240 generates acquisition timing information (the cycle T1) on the image data 110A. The ROI detection unit 240 tracks the ROI image data 125A on the basis of the motion information 210A. For example, when the motion amount (Mx, My) exceeds the predetermined threshold value (Thx, Thy) generated from the ROI information 122A, the ROI detection unit 240 calculates the correction amount Tc corresponding to a difference between the motion amount (Mx, My) and the threshold value (Thx, Thy) to correct the cycle T1 using the calculated correction amount Tc.

The ROI detection unit 240 further generates (corrects) the ROI information 122A using the motion information 210A. The ROI detection unit 240 further outputs, to the image processing unit 230, the ROI information 122A after the correction (the ROI information 240A) and the acquisition timing information (the cycle T1) on the image data 110A. The image processing unit 230 outputs, as control data 230A, data (the ROI information 240A and the cycle T1) inputted from the ROI detection unit 240 to the control section 124 of the image sensor 100 via the control bus B2. In this case, in the image sensor 100, the control section 124 receives the control data 230A from the processor 200, and generates the control signal 124D for controlling an acquisition timing of the image data 110A on the basis of the cycle T1 included in the received control data 230A. The control section 124 further outputs the ROI information 240A to the ROI cut-out section 125. The ROI cut-out section 125 cuts out the one or the plurality of pieces of ROI image data 125A from the image data 110A on the basis of the ROI information 240A inputted from the control section 124. The image processing unit 230 further outputs the ROI information 240A as ROI information 230B to the ROI restoration unit 220.

The ROI detection unit 240 may output, to the image processing unit 230, the ROI information 240A, the acquisition timing information (the cycle T1) on the image data 110A, and the motion information 210A. In this case, the image processing unit 230 outputs, as the control data 230A, the data (the ROI information 240A, the cycle T1, and the motion information 210A) inputted from the ROI detection unit 240 to the control section 124 of the image sensor 100 via the control bus B2. In this case, in the image sensor 100, the control section 124 receives the control data 230A from the processor 200, and generates the control signal 124D for controlling the acquisition timing of the image data 110A on the basis of the cycle T1 included in the received control data 230A. The control section 124 further corrects the ROI information 240A on the basis of the motion information 210A, and outputs the ROI information 240A after the correction to the ROI cut-out section 125. The ROI cut-out section 125 extracts the one or the plurality of pieces of ROI image data 125A from the image data 110A using the ROI information 240A inputted from the control section 124. That is, in the image sensor 100, the control section 124 and the ROI cut-out section 125 extract the one or the plurality of pieces of ROI image data 125A from the image data 110A using the motion information 210A and the ROI information 240A. The image processing unit 230 further outputs the ROI information 240A as the ROI information 230B to the ROI restoration unit 220.

The ROI restoration unit 220 generates (restores) the one or the plurality of pieces of ROI image data 125A included in the image data 110A, for example, on the basis of the ROI image data 210D obtained by decoding and the ROI information 230B, etc. inputted from the image processing unit 230. For example, the ROI restoration unit 220 outputs, as the ROI image data 220A, the one or the plurality of pieces of ROI image data 125A obtained by the generation (restoration) to the image processing unit 230.

In the present modification example, the ROI detection is performed in the processor 200. Even in such a case, it is possible to achieve effects similar to those of the foregoing embodiment.

In addition, in the present modification example, the invalid frame 110C may be sent during a predetermined period from the sending of the plurality of pieces of compressed image data 126A obtained by the compression of the image data 110A to the sending of the compressed image data 126A obtained by the compression of the one or the plurality of pieces of ROI image data 125A (i.e., a certain period after the ROI instruction information (the ROI information 240A and the cycle T1) is received from the processor 200). In such a case, it is possible, for example, to adjust a timing of sending the compressed image data 126A.

Modification Example D

In the foregoing Modification Example C, as illustrated in FIG. 17, for example, a timing unit 150 may be provided instead of the sensor 140. Further, in the foregoing Modification Example C, as illustrated in FIG. 18, for example, a motion detection unit 250 may be provided.

The timing unit 150 generates time data 150A, and outputs the generated time data 150A to the transmission unit 130. At this time, the timing unit 150 generates and sends the transmission data 130A including the time data 150A instead of the motion information 124B. This allows the time data 150A to be communicated to the processor 200 by the transmission of the transmission data 130A. In the processor 200, upon receiving the time data 150A, the reception unit 210 outputs the received time data 150A as time data 210E to the image processing unit 230. This enables the image processing unit 230 to perform processing in consideration of the time data 150A.

The motion detection unit 250 generates motion information 250A on the basis of a plurality of pieces of entire image data 210B obtained by imaging and having mutually different imaging timings. The motion detection unit 250 generates the motion information 250A on the basis of a difference generated between the plurality of pieces of entire image data 210B having mutually different imaging timings in association with the movement of the image sensor 100. For example, the motion detection unit 250 obtains a difference between the two pieces of entire image data 210B inputted from the reception unit 210 to thereby derive the motion amount (Mx, My) of a background of the entire image data 210B within a period corresponding to an acquisition cycle of the two pieces of entire image data 210B. The motion detection unit 250 outputs, as the motion information 250A, for example, the motion amount (Mx, My) derived in this manner to the image processing unit 230.

The image processing unit 230 generates the acquisition timing information (the cycle T1) on the image data 110A on the basis of the ROI information 240A and the motion information 250A inputted from the motion detection unit 250. For example, when the motion amount (Mx, My) exceeds the predetermined threshold value (Thx, Thy) generated from the ROI information 240A, the image processing unit 230 calculates the correction amount Tc corresponding to a difference between the motion amount (Mx, My) and the threshold value (Thx, Thy) to correct the cycle T1 using the calculated correction amount Tc. For example, the image processing unit 230 generates the cycle T1 to allow the cycle T1 to be longer than the imaging cycle of the image data 110A which is used in cutting out the ROI image data 125A.

The image processing unit 230 further generates the ROI information 240A using, for example, the motion information 250A. The image processing unit 230 further corrects (updates) the ROI information 240A, for example, on the basis of the motion information 250A. The image processing unit 230 corrects (updates) the ROI information 240A from the ROI image data 220A. For example, when the motion amount (Mx, My) is equal to or less than the predetermined threshold value (Thx, Thy) generated from the ROI information 240A before the correction (i.e., when the cycle T1 is not changed), the image processing unit 230 calculates the correction amount (Cx, Cy) corresponding to a difference between the motion amount (Mx, My) and the threshold value (Thx, Thy) to correct the ROI information 240A using the calculated correction amount (Cx, Cy). The image processing unit 230 outputs, as the control data 230A, for example, data including the ROI information 240A after the correction and the acquisition timing information (the cycle T1) on the image data 110A to the control section 124 of the image sensor 100 via the control bus B2. The image processing unit 230 further outputs the ROI information 240A as the ROI information 230B to the ROI restoration unit 220. In this case, in the image sensor 100, the control section 124 receives the control data 230A, and generates the control signal 124D for controlling the acquisition timing of the image data 110A on the basis of the cycle T1 included in the received control data 230A. In addition, in the image sensor 100, the control section 124 outputs, to the ROI cut-out section 125, the ROI information 240A (the ROI information 240A after the correction) included in the received control data 230A, for example, at a timing based on the cycle T1 included in the received control data 230A. The ROI cut-out section 125 extracts the one or the plurality of pieces of ROI image data 125A from the image data 110A inputted from the imaging unit 110 using, for example, the ROI information 240A (the ROI information 240A after the correction) inputted from the control section 124.

It is to be noted that the image processing unit 230 may output, as the control data 230A, for example, data including the ROI information 240A, the motion information 250A, and the acquisition timing information (the cycle T1) on the image data 110A to the control section 124 of the image sensor 100 via the control bus B2. In this case, in the image sensor 100, the control section 124 receives the control data 230A, and generates the control signal 124D for controlling the acquisition timing of the image data 110A on the basis of the cycle T1 included in the received control data 230A. In addition, in the image sensor 100, the control section 124 corrects (updates) the ROI information 240A included in the received control data 230A on the basis of the motion information 123A included in the received control data 230A. The control section 124 outputs the ROI information 240A after the correction (updating) to the ROI cut-out section 125, for example, at a timing based on the cycle T1 included in the received control data 230A. The ROI cut-out section 125 extracts the one or the plurality of pieces of ROI image data 125A from the image data 110A inputted from the imaging unit 110 using, for example, the ROI information 240A (the ROI information 240A after the correction) inputted from the control section 124.

[Operation]

Next, description is given of a procedure of data transmission in the communication system 1000 according to the present modification example. FIGS. 19 and 20 illustrate an example of the procedure of the data transmission in the communication system 1000 according to the present modification example.

First, the processor 200 sets an interval at which entire image data is acquired (the entire image acquisition interval Fi) to an initial value, and further initializes the frame counter Fc (Fc=0) (step S201). Next, the processor 200 requests the image sensor 100 to transmit the ROI image data (step S202).

Then, the image sensor 100 acquires the image data 110A which is the entire image (step S203). The image data 110A at this time is, for example, image data of Frame #0 at the upper left of FIG. 8 or image data of Frame #0 at the upper right of FIG. 8. The image sensor 100 outputs the control signal 124D, for example, from the control section 124 to the switch section 121 to thereby output the image data 110A from the switch section 121. Next, the image sensor 100 transmits the image data 110A, which is the entire image, to the processor 200 (step S204).

The processor 200 receives the entire image data 210B (step S205). Next, the processor 200 detects one or a plurality of bodies (objects) included in the entire image data 210B (step S206). Specifically, the processor 200 detects the one or the plurality of object regions (ROIs) included in the entire image data 210B.

Next, the processor 200 calculates ROI information (step S207). Specifically, the image sensor 100 calculates positional information (the ROI information 240A) on the basis of the ROI obtained by the detection. Next, the processor 200 requests the image sensor 100 to transmit the ROI image (step S208).

Then, the image sensor 100 acquires the ROI image (step S209). Specifically, the image sensor 100 cuts out the one or the plurality of pieces of ROI image data 125A from the image data 110A inputted from the imaging unit 110 on the basis of the acquired ROI information 240A. The image sensor 100 transmits the acquired ROI image to the processor 200 (step S210).

The processor 200 receives the ROI image from the image sensor 100 (step S211). Then, the processor 200 increments the frame counter Fc by one (step S212). Next, the processor 200 determines whether or not the frame counter Fc is equal to or more than the entire image acquisition interval Fi (step S213). In a case where the frame counter Fc is equal to or more than the entire image acquisition interval Fi, the processor 200 resets the frame counter Fc to zero (step S214). At this time, the processor 200 proceeds to step S202.

Meanwhile, in a case where the frame counter Fc is not equal to or more than the entire image acquisition interval Fi, the processor 200 compares the ROI images (step S215). The processor 200 determines, in the two pieces of entire image data 210B having mutually different imaging timings, whether there is no difference between two pieces of ROI image data 220A in which mutually common objects are reflected (two pieces of the ROI image data 220A having mutually equal ROI information) or whether or not the difference falls within a predetermined range. The pieces of the ROI image data 220A at this time are, for example, pieces of image data of Frames #2 and #3 on the left side of FIG. 8 or pieces of image data of Frames #2 and #3 on the right side of FIG. 8. As a result, in a case where there is no difference or the difference falls within a predetermined range as described above, the processor 200 determines that the ROI images are coincident with each other, and changes the entire image acquisition interval Fi to a value larger than the current value (step S216). At this time, the processor 200 proceeds to step S208. Meanwhile, in a case where the above difference deviates from within the predetermined range, the processor 200 determines that there is a difference between the ROIs, and proceeds to motion determination (step S217).

In the motion determination, the processor 200 obtains a difference between the two pieces of entire image data 210B inputted from the reception unit 210, for example, to thereby derive the motion amount (Mx, My) of a background of the entire image data 210B within a period corresponding to an acquisition cycle of the two pieces of entire image data 210B. The pieces of entire image data 210B at this time are, for example, pieces of image data of Frames #1 and #4 on the left side of FIG. 8 or pieces of image data of Frames #1 and #4 on the right side of FIG. 8. In a case where the derived motion amount (Mx, My) is large, specifically, in a case where the motion amount (Mx, My) exceeds the predetermined threshold value (Thx, Thy) generated from the ROI information 240A, the processor 200 resets the frame counter Fc to zero, and changes the entire image acquisition interval Fi to a value smaller than the current value (step S218). At this time, the processor 200 proceeds to step S202. Meanwhile, in a case where the motion amount (Mx, My) is small in the motion determination, specifically, in a case where the motion amount (Mx, My) does not exceed the predetermined threshold value (Thx, Thy) generated from the ROI information 240A, the processor 200 updates the ROI information (step S219). At this time, the processor 200 proceeds to step S208.

For example, when the motion amount (Mx, My) is equal to or less than the predetermined threshold value (Thx, Thy) generated from the ROI information 240A before the correction (i.e., when the entire image acquisition interval Fi is not changed), the processor 200 calculates the correction amount (Cx, Cy) corresponding to a difference between the motion amount (Mx, My) and the threshold value (Thx, Thy) to correct the ROI information 240A using the calculated correction amount (Cx, Cy). At this time, the processor 200 proceeds to step S106. In the present modification example, for example, the cycle T1 and the ROI information 240A are corrected (updated) in this manner.

In the present modification example, the ROI detection and the motion detection are performed in the processor 200, and the ROI instruction information (the ROI information 240A and the cycle T1) is transmitted from the processor 200 (the image processing unit 230) to the image sensor 100 (the control section 124). This eliminates the necessity of performing the ROI detection and the motion detection in the image sensor 100, thus making it possible to reduce the amount of data processing in the image sensor 100. As a result, it becomes easier to adapt to high-speed data transmission.

In addition, in the present modification example, for example, in a case where the invalid frame 110C is sent during a predetermined period from the sending of the plurality of pieces of compressed image data 126A obtained by the compression of the image data 110A to the sending of the compressed image data 126A obtained by the compression of the one or the plurality of pieces of ROI image data 125A (i.e., during reception of the same ROI instruction information (the ROI information 240A and the cycle T1) as the previous time from the processor 200 upon detection of the ROI image data 125A), it becomes possible to adjust a timing of sending the compressed image data 126A.

Further, in the present modification example, during the reception of the same ROI instruction information (the ROI information 240A and the cycle T1) as the previous time from the processor 200 upon the detection of the ROI image data 125A, the ROI image data 125A is updated and continued to be transmitted to the processor 200. Even in such a case, for example, in a case where the image sensor 100 is moved, it is possible to obtain the ROI image data 125A with the movement of the image sensor 100 being taken into consideration. Accordingly, even in a case where the image sensor 100 is moved, it is possible to appropriately transmit the ROI while reducing the amount of data processing in the image sensor 100.

Modification Example E

In the foregoing Modification Example D, the size of the ROI image data 220A is set on the basis of the ROI information 240A. Here, in a case where the size of the ROI image data 220A is too large, the data size of the ROI image data 220A results in being too large as well. Therefore, the size of the ROI image data 220A is usually a value equal to or slightly larger than a size corresponding to positional information on the ROI.

However, in the foregoing Modification Example D, there may be a case where the amount of the movement of the object is large enough to cause at least a portion of the object to be missing from the ROI image data 220A until the entire image data 210B is acquired next. In such a case, the ROI cut-out section 125 may change, for example, the size of the ROI image data 220A in accordance with the magnitude of the amount of the movement of the object (e.g., the magnitude of the amount of the movement of the object within the cycle T1).

For example, as illustrated in FIG. 12, in the ROI cut-out section 125, the size of the ROI image data 220A may be made larger than the size thereof in the foregoing embodiment. At this time, the processor 200 may execute a series of procedures of data transmission in the communication system 1000 after replacing step S201 of FIG. 19 with step S220 described in FIG. 21. In step S220, the processor 200 executes the procedure described in step S201, and sets a size ratio s between the object and the ROI image. In step S216 of FIG. 20, the processor 200 may further make the entire image acquisition interval Fi larger, and make the size ratio s smaller. In step S218 of FIG. 20, the processor 200 may further make the entire image acquisition interval Fi smaller, and make the size ratio s larger.

In this manner, in the present modification example, the size of the ROI image data 220A is controlled. This makes it possible to suppress at least a portion of the object being missing from the ROI image data 220A. Accordingly, it is possible to appropriately transmit the ROI even in a case where the image sensor 100 is moved.

Modification Example F

In the foregoing Modification Examples C, D, and E, in a case where pieces of the motion information 210A and 250A are inputted to the image processing unit 230, the image processing unit 230 may output, as the control data 230A, data including the ROI information 240A and the motion information 210A or the motion information 250A to the control section 124 of the image sensor 100 via the control bus B2. In this case, in the image sensor 100, the control section 124 may generate the acquisition timing information (the cycle T1) on the image data 110A on the basis of the motion information 210A or the motion information 250A and the ROI information 240A included in the received control data 230A. For example, when the motion amount (Mx, My) exceeds the predetermined threshold value (Thx, Thy) generated from the ROI information 240A, the image processing unit 230 may calculate the correction amount Tc corresponding to a difference between the motion amount (Mx, My) and the threshold value (Thx, Thy) to correct the cycle T1 using the calculated correction amount Tc.

In the present modification example, the generation of the acquisition timing information (the cycle T1) on the image data 110A is performed in the image sensor 100. Even in such a case, it is possible to achieve effects similar to those of the foregoing Modification Examples C, D, and E.

Modification Example G

As illustrated in FIG. 22, for example, in the foregoing Modification Examples D and E, and Modification Example F of the foregoing Modification Examples D and E, a switch unit 260 may be provided that selects, as input data to the ROI detection unit 240, one of the entire image data 210B and the ROI image data 220A. In addition, in the foregoing Modification Examples D and E, and Modification Example F of the foregoing Modification Examples D and E, a switch unit 270 may be provided that selects, as input data to the motion detection unit 250, one of the entire image data 210B and the ROI image data 220A.

In the present modification example, in a case where the ROI image data 220A is inputted to the motion detection unit 250, the motion detection unit 250 may generate the motion information 250A on the basis of a plurality of pieces of ROI image data 220A obtained at different imaging timings. In this case, the motion detection unit 250 generates the motion information 250A on the basis of a difference generated between the plurality of pieces of ROI image data 220A having mutually different imaging timings in association with the movement of the image sensor 100. This makes it possible, for example, even in a case where the image sensor 100 is moved, to obtain the ROI image data 125A with the movement of the image sensor 100 being taken into consideration. Accordingly, it is possible to appropriately transmit the ROI even in a case where the image sensor 100 is moved.

In the present modification example, selecting the ROI image data 220A as the input data to the ROI detection unit 240 and the motion detection unit 250 makes it possible to reduce the amount of arithmetic processing in the ROI detection unit 240 and the motion detection unit 250 as compared with a case where the entire image data 210B is constantly inputted to the ROI detection unit 240 and the motion detection unit 250.

Modification Example H

In the foregoing Modification Examples D, E, F, and G, the interfaces (the data bus B1 and the control bus B2) that couple the image sensor 100 and the processor 200 to each other, the transmission unit 130, the reception unit 210, and the ROI restoration unit 220 may be omitted, and the image sensor 100 and the processor 200 may be formed as one chip. In this case, the communication system 1000 may include, for example, the imaging unit 110, the image processing unit 120, the ROI detection unit 240, the motion detection unit 250, the image processing unit 230, and the timing unit 150, as illustrated in FIG. 23.

In the present modification example, inputs of the ROI detection unit 240 and the motion detection unit 250 are coupled to an output of the switch section 126, and an output of the timing unit 150 is coupled to the image processing unit 230. Even in such a case, it is possible to achieve effects similar to those of the foregoing embodiment.

3. Application Example

Description is given below of an application example of the communication system 1000 according to the foregoing embodiment and modification examples thereof.

FIGS. 24 and 25 each illustrate a configuration example of a vehicle-mounted camera, as an application example of the communication system 1000. FIG. 24 illustrates an example of installation of vehicle-mounted cameras, and FIG. 25 illustrates an internal configuration example of the vehicle-mounted camera.

For example, as illustrated in FIG. 24, a vehicle-mounted camera 401 is installed at the front (front) of a vehicle 301;

vehicle-mounted cameras 402 and 403 are installed at the left and right; and a vehicle-mounted camera 404 is installed at the rear (rear). Each of the vehicle-mounted cameras 401 to 404 is coupled to an ECU 302 (Electrical Control Unit; electronic control unit) via an in-vehicle network.

The image-capturing angle of the vehicle-mounted camera 401 provided at the front of the vehicle 301 is, for example, in a range indicated by "a" in FIG. 24. The image-capturing angle of the vehicle-mounted camera 402 is, for example, in a range indicated by "b" in FIG. 24. The image-capturing angle of the vehicle-mounted camera 403 is, for example, in a range indicated by "c" in FIG. 24. The image-capturing angle of the vehicle-mounted camera 404 is, for example, in a range indicated by "d" in FIG. 24. Each of the vehicle-mounted cameras 401 to 404 outputs a captured image to the ECU 302. As a result, it is possible for the ECU 302 to capture 360 degree (omnidirectional) images at the front, left and right, and rear of the vehicle 301.

For example, as illustrated in FIG. 25, each of the vehicle-mounted cameras 401 to 404 includes an image sensor 431, a DSP (Digital Signal Processing) circuit 432, a selector 433, and a SerDes (SERializer/DESerializer) circuit 434.

The DSP circuit 432 performs various types of image signal processing on an imaging signal outputted from the image sensor 431. The SerDes circuit 434 performs serial-to-parallel conversion of the signal, and includes, for example, a vehicle-mounted interface chip such as a FPD-Link III.

The selector 433 selects whether to output the imaging signal outputted from the image sensor 431 by passing through the DSP circuit 432 or without passing through the DSP circuit 432.

For example, the communication system 1000 according to any of the foregoing embodiment and modification examples thereof is applicable to a coupling interface 441 between the image sensor 431 and the DSP circuit 432.

Although the description has been given hereinabove of the present disclosure with reference to the embodiment and modification examples thereof, the present disclosure is not limited to the foregoing embodiment, etc., and various modifications may be made. It is to be noted that the effects described herein are merely illustrative. The effects of the present disclosure are not limited to those described herein. The present disclosure may have other effects than those described herein.

In addition, for example, the present disclosure may have the following configurations.

(1)
A transmitter including:
a detection section that detects ROI (Region Of Interest) image data on a basis of ROI instruction information;
a generation section that generates ROI information from the ROI image data detected by the detection section; and
a transmission unit that transmits the ROI image data and the ROI information to an external device, in which
the detection section detects motion information on the detected ROI image data on a basis of one of a plurality of pieces of image data obtained at different imaging timings and a plurality of pieces of the ROI image data obtained at different imaging timings.

(2)
The transmitter according to (1), in which the detection section detects the motion information on a basis of one of a difference generated between the plurality of pieces of image data in association with movement of the transmitter and a difference generated between the plurality of pieces of the ROI image data in association with the movement of the transmitter.

(3)
The transmitter according to (1) or (2), further including a control section that controls an imaging cycle of the image data on a basis of the motion information.

(4)
The transmitter according to any one of (1) to (3), in which
the control section calculates, on a basis of the plurality of pieces of the ROI image data having mutually different imaging timings and in which a mutually common object is reflected, an amount of movement of the object, and
the detection section controls a size of the ROI image data in accordance with a magnitude of the amount of the movement calculated by the control section.

(5)
The transmitter according to any one of (1) to (4), in which the detection section receives the ROI instruction information from the external device.

(6)
The transmitter according to (5), in which the transmission unit transmits an invalid frame to the external device for a certain period after the reception of the ROI instruction information from the external device.

(7)
The transmitter according to any one of (1) to (6), in which
the detection section tracks the ROI image data on a basis of the motion information, and
the generation section updates the ROI information from the ROI image data detected by the tracking of the detection section.

(8)
The transmitter according to any one of (1) to (7), in which the generation section updates and continues to transmit the ROI image data to the external device during reception of same ROI instruction information as previous time from the external device upon the detection of the ROI image data.

(9)
A communication system including:
a transmitter; and
a receiver,
the transmitter including
a first transmission unit that selectively transmits, to the receiver, first image data obtained by imaging and ROI (Region Of Interest) image data extracted from second image data obtained by imaging,
the receiver including
a first generation section that generates motion information on a basis of one of a plurality of pieces of the first image data obtained at different imaging timings and a plurality of pieces of the ROI image data obtained at different imaging timings,
a second generation section that generates ROI information in the second image data, and
a second transmission unit that transmits the motion information and the ROI information to the transmitter, and
the transmitter further including
an extraction section that extracts the ROI image data from the second image data using the motion information and the ROI information.

(10)

The communication system according to (9), in which the first generation section generates the motion information on a basis of a difference generated between the plurality of pieces of the first image data in association with movement of the transmitter.

(11)

The communication system according to (9) or (10), in which the first generation section generates the motion information by using the second image data as the first image data.

(12)

The communication system according to any one of (9) to (11), in which
the second transmission unit transmits, to the transmitter, information on an imaging cycle of the first image data, generated on a basis of the motion information, and
the transmitter further includes a control section that controls the imaging cycle of the first image data on a basis of the information on the imaging cycle inputted from the receiver.

(13)

The communication system according to any one of (9) to (11), in which
the transmitter further includes
a fourth generation section that generates information on an imaging cycle of the first image data on a basis of the motion information, and
a control section that controls the imaging cycle of the first image data on a basis of the information on the imaging cycle.

(14)

The communication system according to (12) or (13), in which
the receiver further includes
a third generation section that generates the information on the imaging cycle of the first image data on the basis of the motion information, and generates the imaging cycle of the first image data to allow the imaging cycle of the first image data to be longer than an imaging cycle of the second image data.

(15)

A communication system including:
a transmitter; and
a receiver,
the transmitter including
a first transmission unit that selectively transmits, to the receiver, first image data obtained by imaging and ROI (Region Of Interest) image data extracted from second image data obtained by imaging,
the receiver including
a first generation section that generates motion information on a basis of one of a plurality of pieces of the first image data obtained at different imaging timings and a plurality of pieces of the ROI image data obtained at different imaging timings,
a second generation section that generates ROI information in the second image data using the motion information, and
a second transmission unit that transmits the ROI information to the transmitter, and
the transmitter extracting the ROI image data from the second image data using the ROI information.

(16)

The communication system according to (15), in which the first generation section generates the motion information on a basis of a difference generated between the plurality of pieces of the first image data in association with movement of the transmitter.

(17)

The communication system according to (15) or (16), in which the first generation section generates the motion information by using the second image data as the first image data.

(18)

The communication system according to any one of (15) to (17), in which
the second transmission unit transmits, to the transmitter, information on an imaging cycle of the first image data, generated on a basis of the motion information, and
the transmitter further includes a control section that controls the imaging cycle of the first image data on a basis of the information on the imaging cycle inputted from the receiver.

(19)

The communication system according to (18), in which
the receiver further includes
a third generation section that generates the information on the imaging cycle of the first image data on the basis of the motion information, and generates the imaging cycle of the first image data to allow the imaging cycle of the first image data to be longer than an imaging cycle of the second image data.

(20)

A communication system including:
a transmitter; and
a receiver,
the transmitter including
a first transmission unit that transmits, to the receiver, ROI (Region Of Interest) image data extracted from image data obtained by imaging,
the receiver including
a generation section that generates ROI information in the image data, and
a second transmission unit that transmits, to the transmitter, motion information on the transmitter obtained by a sensor and the ROI information, and
the transmitter further including
an extraction section that extracts the ROI image data from the image data using the motion information and the ROI information.

(21)

A communication system including:
a transmitter; and
a receiver,
the transmitter including
a first transmission unit that transmits, to the receiver, ROI (Region Of Interest) image data extracted from image data obtained by imaging,
the receiver including
a second generation section that generates ROI information in the image data using motion information on the transmitter obtained by a sensor, and
a second transmission unit that transmits the ROI information to the transmitter, and
the transmitter extracting the ROI image data from the image data using the ROI information.

(22)

A receiver including:
a reception unit that receives image data;
a detection section that detects ROI (Region Of Interest) image data from the received image data;

a generation section that generates ROI instruction information from the ROI image data detected by the detection section; and a transmission unit that transmits the ROI instruction information, in which the detection section detects motion information on the detected ROI image data on a basis of one of a plurality of pieces of the image data obtained at different imaging timings and a plurality of pieces of the ROI image data obtained at different imaging timings.

(23)
The receiver according to (22), in which
the detection section tracks the ROI image data on a basis of the motion information, and
the generation section updates the ROI instruction information from the ROI image data detected by the tracking of the detection section.

According to the transmitter of an embodiment of the present disclosure, the first communication system of an embodiment of the present disclosure, the second communication system of an embodiment of the present disclosure, the third communication system of an embodiment of the present disclosure, the fourth communication system of an embodiment of the present disclosure, and the receiver of an embodiment of the present disclosure, it is possible to appropriately transmit the ROI even in a case where the transmitter is moved.

This application claims the benefit of Japanese Priority Patent Application JP2019-141248 filed with the Japan Patent Office on Jul. 31, 2019, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A transmitter comprising:
a memory storing instructions, and
a processor configured to execute the instructions to perform operations comprising:
detecting ROI (Region Of Interest) image data on a basis of ROI instruction information to provide detected ROI image data;
generating ROI information from the detected ROI image data;
transmitting the detected ROI image data and the ROI information to an external device; and
detecting motion information on the detected ROI image data based upon respective image data obtained at different imaging timings and respective ROI image data obtained at different imaging timings.

2. The transmitter according to claim 1, wherein the operations further comprise:
detecting the motion information based upon one of a difference generated between the respective image data in association with movement of the transmitter and a difference generated between the respective ROI image data in association with the movement of the transmitter.

3. The transmitter according to claim 1, wherein the operations further comprise:
controlling an imaging cycle of the respective image data on a basis of the motion information.

4. The transmitter according to claim 1, wherein the operations further comprise:

calculating, on a basis of the respective ROI image data at the different imaging timings in which a common object is reflected, an amount of movement of the common object; and
controlling a size of the detected ROI image data in accordance with a magnitude of the amount of the movement calculated.

5. The transmitter according to claim 1, wherein the operations further comprise:
receiving the ROI instruction information from the external device.

6. The transmitter according to claim 5, wherein the operations further comprise:
transmitting an invalid frame to the external device for a certain period after receiving the ROI instruction information from the external device.

7. The transmitter according to claim 1, wherein the operations further comprise:
tracking the detected ROI image data on a basis of the motion information; and
updating the ROI information from the tracked ROI image data.

8. The transmitter according to claim 1, wherein the operations further comprise:
updating and continuing to transmit the ROI image data to the external device during reception of a same ROI instruction information as a previous time from the external device upon detecting the ROI image data.

9. A communication system comprising:
a transmitter; and
a receiver,
the transmitter including
a first transmission unit that selectively transmits, to the receiver, first image data obtained by imaging and ROI (Region Of Interest) image data extracted from second image data obtained by imaging,
the receiver including
a first generation section that generates motion information on a basis of one of a plurality of pieces of the first image data obtained at different imaging timings and a plurality of pieces of the ROI image data obtained at different imaging timings,
a second generation section that generates ROI information on the ROI image data, and
a second transmission unit that transmits the motion information and the ROI information to the transmitter, and
the transmitter further including
an extraction section that extracts the ROI image data from the second image data using the motion information and the ROI information.

10. The communication system according to claim 9, wherein the first generation section generates the motion information on a basis of a difference generated between the plurality of pieces of the first image data in association with movement of the transmitter.

11. The communication system according to claim 9, wherein the first generation section generates the motion information by using the second image data as the first image data.

12. The communication system according to claim 9, wherein
the second transmission unit transmits, to the transmitter, information on an imaging cycle of the first image data, generated on a basis of the motion information, and the transmitter further includes a control section that controls the imaging cycle of the first image data on a basis of the information on the imaging cycle inputted from the receiver.

13. The communication system according to claim 12, wherein the receiver further includes
a third generation section that generates the information on the imaging cycle of the first image data on the basis of the motion information, and generates the imaging cycle of the first image data to allow the imaging cycle of the first image data to be longer than an imaging cycle of the second image data.

14. The communication system according to claim 9, wherein
the transmitter further includes
a fourth generation section that generates information on an imaging cycle of the first image data on a basis of the motion information, and
a control section that controls the imaging cycle of the first image data on a basis of the information on the imaging cycle.

15. A communication system comprising:
a transmitter; and
a receiver,
the transmitter including
a first transmission unit that selectively transmits, to the receiver, first image data obtained by imaging and ROI (Region Of Interest) image data extracted from second image data obtained by imaging,
the receiver including
a first generation section that generates motion information on a basis of one of a plurality of pieces of the first image data obtained at different imaging timings and a plurality of pieces of the ROI image data obtained at different imaging timings,
a second generation section that generates ROI information on the ROI image data using the motion information, and
a second transmission unit that transmits the ROI information to the transmitter, and wherein
the transmitter extracts the ROI image data from the second image data using the ROI information
the second transmission unit transmits, to the transmitter, information on an imaging cycle of the first image data, generated on a basis of the motion information,
the transmitter further includes a control section that controls the imaging cycle of the first image data on a basis of the information on the imaging cycle inputted from the receiver, and
the receiver further includes a third generation section that generates the information on the imaging cycle of the first image data on the basis of the motion information, and generates the imaging cycle of the first image data to allow the imaging cycle of the first image data to be longer than an imaging cycle of the second image data.

16. The communication system according to claim 15, wherein the first generation section generates the motion information on a basis of a difference generated between the plurality of pieces of the first image data in association with movement of the transmitter.

17. The communication system according to claim 15, wherein the first generation section generates the motion information by using the second image data as the first image data.

18. A receiver comprising:
a memory storing instructions, and
a processor configured to execute the instructions to perform operations comprising:
receiving image data;
detecting ROI (Region Of Interest) image data from the received image data to provide detected ROI image data;
generating ROI instruction information from the detected ROI image data;
transmitting the ROI instruction information; and
detecting motion information on the detected ROI image data based upon respective image data obtained at different imaging timings and respective ROI image data obtained at different imaging timings.

19. The receiver according to claim 18, wherein the operations further comprise:
tracking the detected ROI image data on a basis of the motion information; and
updating the ROI instruction information from the tracked ROI image data.

20. A non-transitory computer readable medium storing instructions for controlling a receiver, the instructions being executable by a processor to perform operations comprising:
receiving, by the receiver, image data;
detecting ROI (Region Of Interest) image data from the received image data to provide detected ROI image data;
generating ROI instruction information from the detected ROI image data;
transmitting the ROI instruction information; and
detecting motion information on the detected ROI image data based upon respective image data obtained at different imaging timings and respective ROI image data obtained at different imaging timings.

21. The non-transitory computer readable medium according to claim 20, wherein the operations further comprise:
tracking the detected ROI image data on a basis of the motion information; and
updating the ROI instruction information from the tracked ROI image data.

22. A non-transitory computer readable medium storing instructions for controlling a transmitter, the instructions being executable by a processor to perform operations comprising:
detecting ROI (Region Of Interest) image data on a basis of ROI instruction information to provide detected ROI image data;
generating ROI information from the detected ROI image data;
transmitting the detected ROI image data and the ROI information to an external device; and
detecting motion information on the detected ROI image data based upon respective image data obtained at different imaging timings and respective ROI image data obtained at different imaging timings.

23. The non-transitory computer readable medium according to claim 22, wherein the operations further comprise:
detecting the motion information based upon one of a difference generated between the respective image data in association with movement of the transmitter and a difference generated between the respective ROI image data in association with the movement of the transmitter.

* * * * *